(12) United States Patent
Akhter et al.

(10) Patent No.: US 8,730,983 B1
(45) Date of Patent: May 20, 2014

(54) METHOD AND APPARATUS FOR A CONFIGURABLE PACKET ROUTING, BUFFERING AND SCHEDULING SCHEME TO OPTIMIZE THROUGHPUT WITH DEADLOCK PREVENTION IN SRIO-TO-PCIE BRIDGES

(75) Inventors: Mohammad Shahanshah Akhter, Ottawa (CA); Zixiong William Wang, Ottawa (CA); David Clifton Bond, Ottawa (CA); Gregory Edward Lund, Eau Claire, WI (US)

(73) Assignee: Integrated Device Technology, Inc., San Jose, CA (US)

( * ) Notice: Subject to any disclaimer, the term of this patent is extended or adjusted under 35 U.S.C. 154(b) by 508 days.

(21) Appl. No.: 12/916,580

(22) Filed: Oct. 31, 2010

(51) Int. Cl.
*H04L 12/00* (2006.01)
*G06F 3/00* (2006.01)
*G06F 5/00* (2006.01)
*G06F 13/14* (2006.01)

(52) U.S. Cl.
USPC .............................. 370/412; 710/52; 710/305

(58) Field of Classification Search
USPC .................. 370/229, 394, 412, 413; 709/225
See application file for complete search history.

(56) References Cited

U.S. PATENT DOCUMENTS

| | | | |
|---|---|---|---|
| 6,721,816 B1* | 4/2004 | Magro et al. ...................... | 710/6 |
| 7,046,687 B1* | 5/2006 | Brown et al. ................. | 370/412 |
| 7,079,485 B1* | 7/2006 | Lau et al. ...................... | 370/229 |
| 7,209,482 B1* | 4/2007 | Rahim .......................... | 370/394 |
| 7,991,875 B2* | 8/2011 | Chou et al. .................... | 709/224 |
| 7,996,604 B1* | 8/2011 | Kavipurapu et al. ......... | 711/109 |
| 2002/0126669 A1* | 9/2002 | Tuck et al. .................... | 370/390 |
| 2003/0058880 A1* | 3/2003 | Sarkinen et al. .............. | 370/413 |
| 2003/0103450 A1* | 6/2003 | Chapman et al. ............. | 370/229 |
| 2004/0258062 A1* | 12/2004 | Narvaez ........................ | 370/389 |
| 2005/0182833 A1* | 8/2005 | Duffie et al. .................. | 709/224 |
| 2006/0031490 A1* | 2/2006 | Provine et al. ................ | 709/225 |
| 2006/0133430 A1* | 6/2006 | Nagesh et al. ................ | 370/536 |
| 2006/0256793 A1* | 11/2006 | Swartzentruber et al. .... | 370/394 |
| 2008/0016510 A1* | 1/2008 | Gallezot et al. .............. | 718/104 |
| 2008/0279195 A1* | 11/2008 | Okuno ........................ | 370/395.6 |
| 2009/0010279 A1* | 1/2009 | Tsang et al. .................. | 370/468 |
| 2009/0077433 A1* | 3/2009 | Shearer et al. ................ | 714/704 |
| 2009/0285231 A1* | 11/2009 | Frink ............................ | 370/412 |
| 2012/0170858 A1* | 7/2012 | Andersson et al. ........... | 382/238 |

OTHER PUBLICATIONS

Sam Fuller, RapidIO: The Next Generation Communication Fabric for Embedded Application, 2005, ISBN: 9780470092910.*

* cited by examiner

*Primary Examiner* — Habte Mered
*Assistant Examiner* — Yaotang Wang
(74) *Attorney, Agent, or Firm* — Heimlich Law, PC; Alan Heimlich, Esq.

(57) ABSTRACT

A method and apparatus for a configurable packet routing, buffering and scheduling scheme to optimize throughput with deadlock prevention in SRIO-to-PCIe Bridges have been described. A single level enqueue method with dynamic buffering and dequeuing based on packet re-ordering is disclosed. Single level packet routing and scheduling to meet SRIO and PCIe rules to enqueue packets based on FType/TType is disclosed. Backpressure based on ingress watermarks for different packet types is disclosed. Use of a circular-reorder queue (CRQ) for both ingress and egress allows packet reordering and packet passing.

9 Claims, 30 Drawing Sheets

| FType | TType | TRANSaction Type (aka TType) | | | FType Filter Control |
|---|---|---|---|---|---|
| | | Class | Description | | (Reg. Field Name) |
| 0 | 4'b0000 | Implementation-defined | --- | | F0_IMPLEMENTATION |
| 1 | 4'b0000 | Intervention-Request | READ_OWNER | | F1_INTERVENTION |
| | 4'b0001 | Intervention-Request | READ_TO_OWN_OWNER | | |
| | 4'b0010 | Intervention-Request | IO_READ_OWNER | | |
| 2 | 4'b0000 | Request | READ_HOME | | F2_GSM |
| | 4'b0001 | Request | READ_TO_OWN_HOME | | |
| | 4'b0010 | Request | IO_READ_HOME | | |
| | 4'b0011 | Request | DKILL_HOME | | |
| | 4'b0100 | Request | NREAD | | F2_NREAD |
| | 4'b0101 | Request | IKILL_HOME | | F2_GSM |
| | 4'b0110 | Request | TLBIE | | |
| | 4'b0111 | Request | TLBSYNC | | |
| | 4'b1000 | Request | IREAD_HOME | | |
| | 4'b1001 | Request | FLUSH without data | | |
| | 4'b1010 | Request | IKILL_SHARER | | |
| | 4'b1011 | Request | DKILL_SHARER | | |
| | 4'b1100 | Request | ATOMIC increment | | F2_ATOMIC |
| | 4'b1101 | Request | ATOMIC decrement | | |
| | 4'b1110 | Request | ATOMIC set | | |
| | 4'b1111 | Request | ATOMIC clear | | |

FIG. 7A

| Row/Pass Column? | RFDID | MR | MWR | DB | M | P | CPL | NP |
|---|---|---|---|---|---|---|---|---|
| RFDID | N | Y | Y | Y | Y | Y | Y | Y |
| MR | Y | N | Y | Y | Y | Y | Y | Y |
| MWR | Y | Y | N | Y | Y | Y | Y | Y |
| DB | Y | Y | Y | N | Y | Y | Y | Y |
| M | Y | Y | Y | Y | N | Y | Y | Y |
| P | Y | Y | Y | Y | Y | N | N | N |
| CPL | Y | Y | Y | Y | Y | N | N | N |
| NP | Y | Y | Y | Y | Y | N | N | N |

FIG. 20

| 2102 Packet Type | PBM Ingress 2104 VOQ | request 2106 [7:0] | 2108 srl_buf_full[7:0] |
|---|---|---|---|
| RFDID | 7 | 7 | 7 |
| Messaging Response (MR) | 6 | 6 | 6 |
| Maintenance Write Response (MWR) | 5 | 5 | 5 |
| Doorbell Maintenance (DB) | 4 | 4 | 4 |
| Messaging (M) | 3 | 3 | 3 |
| Posted (P) | 2 | 2 | 2 |
| Completion (CPL) | 1 | 1 | 1 |
| Non-Posted (NP) | 0 | 0 | 0 |

FIG. 21

1. An apparatus comprising:
   a serializer/deserializer (SERDES) interface;
   an ingress physical layer module (PLMi) operatively coupled to said SERDES;
   an ingress transport layer module (TLMi) having a port mapping block, a routing block, a port width conversion (PWC) block, and transport processing block, said TLMi operatively coupled to said PLMi;
   an ingress packet buffer module (PBMi) having an enqueue block, a plurality of virtual output queues (VOQs), a plurality of data memories, and a dequeue block, said PBMi operatively coupled to said TLMi.
   2401

2. The apparatus of claim 1 further comprising:
   an endpoint fabric module (EFM) having a scheduler, a switch, an arbiter, and a port select, said EFM operatively coupled to said PBMi.
   2402

3. The apparatus of claim 2 further comprising:
   an ingress user core gasket, said ingress user core gasket operatively coupled to said EFM;
   an egress user core gasket, said egress user core gasket operatively coupled to said EFM;
   a user core, said user core operatively coupled to said ingress user core gasket; and
   said user core operatively coupled to said egress user core gasket.
   2403

4. The apparatus of claim 3 further comprising:
   an ingress logical layer module (LLMi), said LLMi operatively coupled to said EFM, and said LLMi operatively coupled to said ingress user core gasket; and said LLMi operatively coupled to said egress user core gasket; and
   an egress logical layer module (LLMe), said LLMe operatively coupled to said EFM, and said LLMe operatively coupled to said ingress user core gasket, and said LLMe operatively coupled to said egress user core gasket.
   2404

5. The apparatus of claim 4 further comprising:
   an egress packet buffer module (PBMe), said PBMe having an enqueue block, a plurality of data memories, a plurality of circular-reorder queues (CRQ), and a dequeue block, said PBMe operative coupled to said EFM.
   2405

6. The apparatus of claim 5 further comprising:
   an egress transport layer module (TLMe) having a transport processing block, and a port width conversion (PWC) block, said TLMe operatively coupled to said PBMe.
   2406

7. The apparatus of claim 6 further comprising:
   an egress physical layer module (PLMe), said PLMe operatively coupled to said TLMe;
   said PLMe operatively coupled to said SERDES interface; and
   said PLMe operatively coupled to said PLMi.
   2407

8. The apparatus of claim 7 wherein said PBMi said plurality of VOQs and said PBMi said plurality of data memories are user configurable based on a number of ports in use from said SERDES interface.
   2408

9. The apparatus of claim 8 wherein said PBMe said plurality of CRQs and said PBMe said plurality of data memories are user configurable based on a number of ports in use from said SERDES interface.
   2409

10. A method comprising:
    replicating a user defined number of blocks, said blocks having a SERDES interface, a SRIO core, RAM instances, an interface to a logical layer module, and an interface to an internal fabric switch;
    connecting all of said blocks to said internal fabric switch; and
    connecting all of said blocks to said logical layer module.
    2410

FIG. 24A

11. The method of claim 10 wherein said logical layer module handles any number of said blocks.
2411

12. The method of claim 11 wherein said logical layer module is a single logical layer module.
2412

13. An apparatus comprising:
a tag enqueue block having an input and an output, said tag enqueue block input coupled to receive packet flowID on a per channel basis from a fabric;
an egress tag CRQ having an input, an output, a back pressure output, and a data memory, said egress tag CRQ input coupled to receive said tag enqueue block output, said egress tag CRQ back pressure output coupled to said fabric, said data memory coupled to said fabric;
a packet dequeue block having a first input and a second input, said packet dequeue block first input coupled to said egress tag CRQ output; and
an egress transport layer module (TLMe) having a pacing and acknowledgement output, a data input, and a data pacing output, said packet dequeue block second input coupled to receive said TLMe pacing and acknowledgement output, said TLMe data input coupled to said data memory, and said TLMe data pacing output coupled to said memory.
2413

14. An apparatus comprising:
a tag enqueue block having an input, an output, and a VOQ enqueue notification per channel output, said tag enqueue block input coupled to receive a port mask, a CRF, and a PRIO on a per channel basis from a transport layer;
an ingress tag memory block having, an ingress tag memory, a tail VOQ table, and a head VOQ table, said tail VOQ table coupled to said tag enqueue block output;
a packet dequeue block having a first input and a second input, said packet dequeue block first input coupled to said head VOQ table;
a scheduler having an input, a grant interface per channel output, and a VOQ interface per channel output, said tag enqueue block VOQ enqueue notification per channel output coupled to said scheduler input, said scheduler grant interface per channel output coupled to said packet dequeue block second input, and said scheduler VOQ interface per channel output coupled to said head VOQ table.
2414

15. The apparatus of claim 14 wherein said ingress tag memory block further comprises a memory having a first input, a second input, and an output, said memory first input coupled to said transport layer, and said memory output coupled to a switch fabric, and said second input coupled to said switch fabric.
2415

FIG. 24B

METHOD AND APPARATUS FOR A CONFIGURABLE PACKET ROUTING, BUFFERING AND SCHEDULING SCHEME TO OPTIMIZE THROUGHPUT WITH DEADLOCK PREVENTION IN SRIO-TO-PCIE BRIDGES

RELATED APPLICATION

This application is related to application Ser. No. 12/916,568 filed this same date titled "Method and Apparatus for a configurable packet routing, buffering and scheduling scheme to optimize throughput with deadlock prevention in SRIO-to-PCIe Bridges", which is hereby incorporated herein by reference in its entirety including all incorporated references therein. This application is related to application Ser. No. 12/916,574 filed this same date titled "Method and Apparatus for a configurable packet routing, buffering and scheduling scheme to optimize throughput with deadlock prevention in SRIO-to-PCIe Bridges", which is hereby incorporated herein by reference in its entirety including all incorporated references therein.

FIELD OF THE INVENTION

The present invention pertains to packet routing, buffering and scheduling. More particularly, the present invention relates to a method and apparatus for a configurable packet routing, buffering and scheduling scheme to optimize throughput with deadlock prevention in SRIO-to-PCIe bridges.

BACKGROUND OF THE INVENTION

Serial Rapid Input Output (SRIO) and Peripheral Component Interconnect Express (PCIe) are known to one of skill in the art as input/output (I/O) interfaces. Equally well known to one of skill in the art is that SRIO and PCIe have differing specifications, protocols, and requirements.

SRIO based End-Points (EP) rely on flowid to route, watermarks to store, and Request-Grant-Accept (RGA) type algorithm to schedule packets. When the SRIO EP is used in a bridge application, the existing packet routing and scheduling schemes cannot transfer packets while meeting both SRIO and PCIe ordering rules and may create deadlock in the system. This presents a problem.

BRIEF DESCRIPTION OF THE DRAWINGS

The invention is illustrated by way of example and not limitation in the figures of the accompanying drawings in which:

FIG. 7A, and FIG. 7B illustrate one embodiment of the invention showing an enqueue operation summary for a bridge packet routing based on Ftype and Ttype;

FIG. 20 illustrates one embodiment of the invention showing Bridge Ordering Rule and Scheduling for Dequeue operations with backpressure;

FIG. 21 illustrates one embodiment of the invention showing Packet Ordering and Priorities for VOQ Allocation;

FIG. 24A, and FIG. 24B illustrate embodiments of the invention.

DETAILED DESCRIPTION

Figure 1:
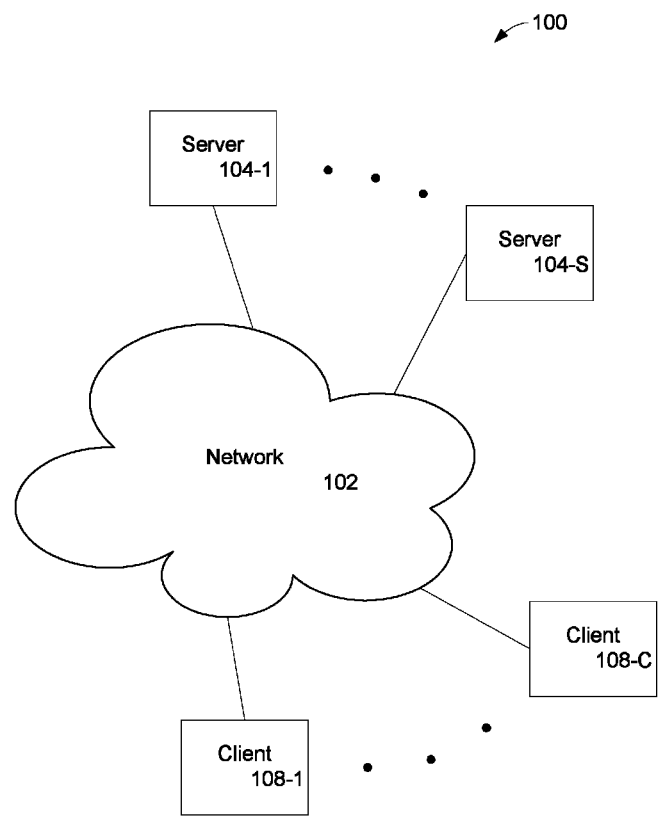
FIG. 1 illustrates a network environment in which the method and apparatus of the invention may be implemented.

This invention deals in detail with aspects of the Serial Rapid Input Output (SRIO) and Peripheral Component Interconnect Express (PCIe). As such one of ordinary skill in the art is familiar with both of these, their specifications, mnemonics, protocols, etc. References may be found on the Internet, for example, at http://www.wikipedia.org/, http://www-.pcisig.com/home, and http://www.rapidio.org/home/.

To assist the reader who may not be one of ordinary skill in the art and familiar with SRIO and PCIe, etc. The following abbreviations/terms are as noted:

ASIC—application-specific integrated circuit
BGA—ball grid array
CMOS—Complementary metal-oxide-semiconductor
CRC—cyclic redundancy check
CRF—Critical Request Flow
CRQ—Circular-reorder queue or Circular Reordering Queue
destID—destination identification
DNFL—Data Node Free List
DNFL-UP—Data Node Free List Unacknowledged Pointer
DSP—Digital signal processing
EFM—Endpoint Fabric Module
EoP or EOP or eop—end of packet
FIFO—first in first out
FlowID—flow identification (e.g. the combination of RapidIO packet's PRIOrity and Critical-Request-Flow fields)
GPIO—general purpose input output
I/F—interface
I2C—Inter-Integrated Circuit JTAG—Joint Test Action Group
LLM—Logical Layer Module
LUT—look up table
PA—Packet Acknowledgement
PBM—Packet Buffer Module
PBM—Packet Buffer Module
PBMe—Packet Buffer Module egress
PBMi—Packet Buffer Module ingress
PCIe—Peripheral Component Interconnect Express
PLM—Physical Layer Module
PRIO—prioity
PWCe—Port Width Conversion
PWCi—Port Width Conversion Ingress
RAM—random access memory
RapidIO—rapid input output
RGA—Request-Grant-Accept
SERDES—Serializer/Deserializer
SoP or SOP or sop—start of packet
SRIO—Serial Rapid Input Output
S-RIO—Serial Rapid Input Output
STOMP or stmp—a control discard signal to stomp a signal
TLM—Transport Layer Module
TLM—transport layer module
TLMe—transport layer module egress
TLMi—transport layer module ingress
TSMC—Taiwan Semiconductor Manufacturing Company
UDI—User Defined Interface Module; also called the User Core Gasket
VOQ—Virtual Output Queue (e.g. a storage mechanism where packets are segregated but kept in timestamp order within the segregation)
Generally:
XXXi—denotes XXX ingress
XXXe—denotes XXX egress
So for example:
LLMi—Logical Layer Module ingress
LLMe—Logical Layer Module egress
That is the lower-case suffix "i" indicates ingress flow, and "e" indicates egress flow. For example, PLMi is the ingress PLM.

In one embodiment of the invention, configurable packet routing is based on Rapid Input Output (RIO) format type (FTYPE) and RIO transaction type (TTYPE) (often denoted FTYPE/TTYPE and corresponding to FTYPE[0:3] and TTYPE[0:3] respectively), link-partner backpressure generation based on configurable watermarks, and re-ordered packet dequeue scheduler together with per queue backpressure which ensures that SRIO and PCIe packet routing rules are met while preventing deadlock and meeting the required throughput, complexity, and power consumption for SRIO-to-PCIe bridges.

In one embodiment of the invention, a SRIO-to-PCIe bridge uses one level of dynamic buffering and scheduling where the enqueue method is chosen based on SRIO FTYPE and TTYPE, SRIO ordering rules and link-partner retry are maintained based on ingress buffer watermarks and the PCIe ordering rules are maintained by a re-ordered packet dequeue scheduler together with per-flow backpressure from the user application layer.

In one embodiment of the invention, a SRIO-to-PCIe bridge supports both SRIO and PCIe ordering while preventing deadlock and while sustaining throughput up to a line rate of the interface (e.g. 20 Gbps, etc.).

In one embodiment of the invention, different types of SRIO packets and backpressures from the PCIe side can be applied to stop particular packet queues.

In one embodiment of the invention, changing the FTYPE/TTYPE and changing the ordering for a stream of packets and changing the watermarks for the corresponding packet queues results in the corresponding packet outputs and orders on the PCIe side matching the expected order.

In one embodiment of the invention, line rate performance for traffic with both S-RIO (SRIO) and PCIe priority and ordering rules while avoiding any deadlock in the system can be achieved.

In one embodiment of the invention in a SRIO-to-PCIe bridge, a single level enqueue approach with dynamic buffering and dequeing based on packet re-ordering is used.

In one embodiment of the invention in a SRIO-to-PCIe bridge, a single level enqueue approach with dynamic buffering and dequeing based on packet re-ordering is used and ensures that both SRIO and PCIe ordering rules are maintained without deadlock.

In one embodiment of the invention in a SRIO-to-PCIe bridge, a single level enqueue approach with dynamic buffering and dequeing based on packet re-ordering is used and ensures that "bubble-less" throughput is sustained up to the line rate of the interface (e.g. 20 Gbps, 40 Gbps, etc.).

In one embodiment of the invention in a SRIO-to-PCIe bridge, the enqueue approach routes and buffers packets with a configurable option to support terminating end points (EP) and bridging EP applications.

In one embodiment of the invention in a SRIO-to-PCIe bridge, the enqueue approach supports dynamic buffer allocation using Virtual Output Queue (VOQ) structure to reduce memory wastage. This dynamic buffer allocation allows the buffer to be dynamically sized based on different packet requirements (e.g. different packet types, different packet sizes, etc.). This allows more effective use of buffer memory versus a buffer memory allocation based on a pre-specified size which is fixed.

In one embodiment of the invention, the enqueue approach supports single level packet routing and scheduling to meet S-RIO and PCIe rules to enqueue packets based on FTYPE/TTYPE, i.e., VOQ allocation.

In one embodiment of the invention, the enqueue approach generates backpressure towards a link-partner based on ingress watermarks.

In one embodiment of the invention, the dequeue approach uses a circular-reorder queue (CRQ) to dequeue packets on ingress flow.

In one embodiment of the invention, the dequeue approach uses CRQ on egress to support packet reorder and track packet acknowledgement.

In one embodiment of the invention, the dequeue approach supports multiple packet flows.

In one embodiment of the invention in a SRIO-to-PCIe bridge, the dequeue approach can generate application layer (e.g. towards the bridge) backpressure for each queue.

Figure 3A:
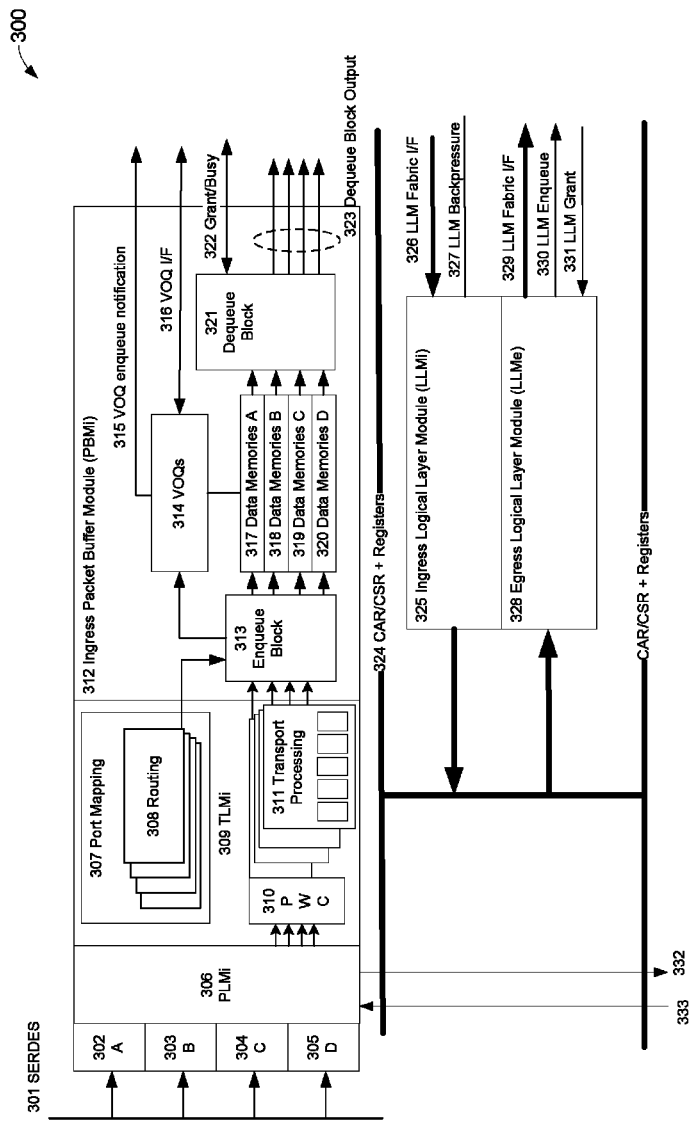
FIG. 3A, FIG. 3B, and FIG. 3C illustrates one embodiment of the invention showing an overall architecture.

FIG. 3A illustrates generally at 300 part of an overall architecture. At 301 is a SERDES (Serializer/Deserializer) interface sending input data A to port 302, input data B to port B 303, input data C to port C 304, and input data D to port D 305. At 306 is PLMi. At 309 is TLMi which has 307, 308, 310, 311. At 307 is Port Mapping. Within 307 is 308 Routing which handles each of input data A, input data B, input data C, and input data D. At 310 is PWC. At 311 is Transport Processing which handles each of input data A, input data B, input data C, and input data D. At 312 is Ingress Packet Buffer Module (PBMi). At 313 is Enqueue Block. At 314 is VOQs. At 317 is Data Memories A (corresponding to input data A). At 318 is Data Memories B (corresponding to input data B). At 319 is Data Memories C (corresponding to input data C).

At 320 is Data Memories D (corresponding to input data D). At 321 is Dequeue Block. At 315 is a signal VOQ enqueue notification. At 316 is VOQ I/F (InterFace). At 322 is Grant/Busy. At 323 is Dequeue Block Output. At 326 is LLM Fabric I/F. At 327 is LLM Backpressure. At 325 is Ingress Logical Layer Module (LLMi). At 324 is CAR/CSR+Registers. At 328 is Egress Logical Layer Module (LLMe). At 329 is LLM Fabric I/F (for 328). At 330 is LLM Enqueue. At 331 is LLM Grant. At 332 is an output from 306 PLMi. At 333 is an input to 306 PLMi.

Figure 3B:
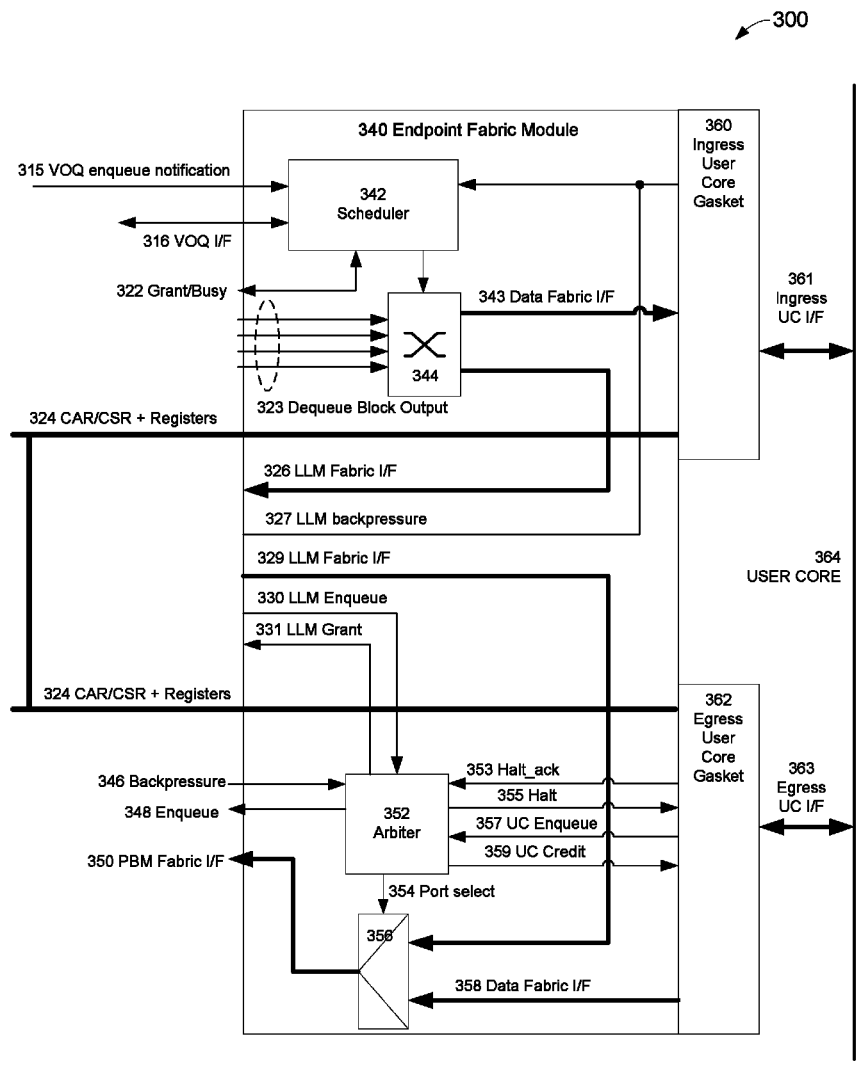

FIG. 3B illustrates generally at 300 part of an overall architecture. At 340 is Endpoint Fabric Module. At 342 is Scheduler. At 315 is a signal VOQ enqueue notification. At 326 is VOQ I/F (InterFace). At 322 is Grant/Busy. At 323 is Dequeue Block Output. At 324 is CAR/CSR+Registers. At 326 is LLM Fabric I/F. At 327 is LLM Backpressure. At 329 is LLM Fabric I/F (for 328). At 330 is LLM Enqueue. At 331 is LLM Grant. At 346 is Backpressure. At 348 is Enqueue. At 350 is PBM Fabric I/F. At 344 is Data Fabric. At 343 is Data Fabric I/F. At 352 is an Arbiter. At 354 is a Port select signal. At 356 is a Port Selector. At 358 is a Data Fabric I/F. At 353 is Halt_ack (Halt Acknowledge). At 355 is a Halt signal. At 357 is a UC (User Core) Enqueue signal. At 359 is a UC Credit. At 364 is a USER CORE that interfaces to the 360 Ingress User Core Gasket via the 361 Ingress UC I/F. At 364 is a USER CORE that interfaces to the 362 Egress User Core Gasket via the 363 Egress UC I/F.

Figure 3C:
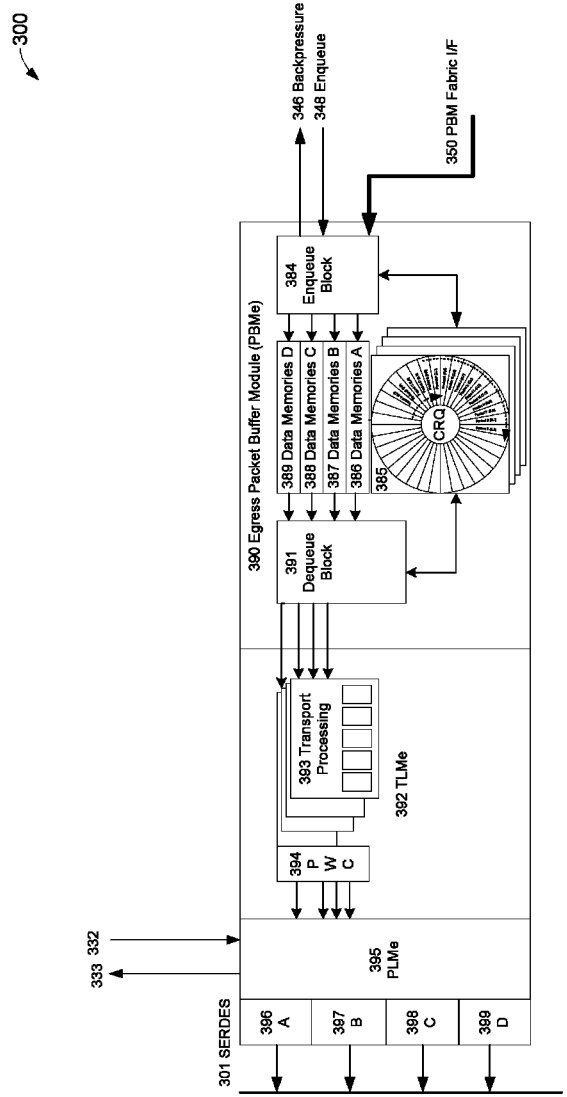

FIG. 3C illustrates generally at 300 part of an overall architecture.

At 301 is a SERDES (Serializer/Deserializer) interface receiving output data A from port 396, output data B from port B 397, output data C from port C 398, and output data D from port D 399. At 395 is PLMe. At 332 is an input to 395 PLMe. At 333 is an output from 395 PLMe. At 392 is TLMe which has 394, 393. At 394 is PWC. At 393 is Transport Processing which handles each of output data A, output data B, output data C, and output data D.

At 390 is Egress Packet Buffer Module (PBMe). At 384 is Enqueue Block. At 385 is CRQ one each corresponding to output data A, output data B, output data C, and output data D. At 386 is Data Memories A (corresponding to output data A). At 387 is Data Memories B (corresponding to output data B). At 388 is Data Memories C (corresponding to output data C). At 389 is Data Memories D (corresponding to output data D). At 391 is Dequeue Block. At 346 is Backpressure. At 348 is Enqueue. At 350 is PBM Fabric I/F.

Figure 4:
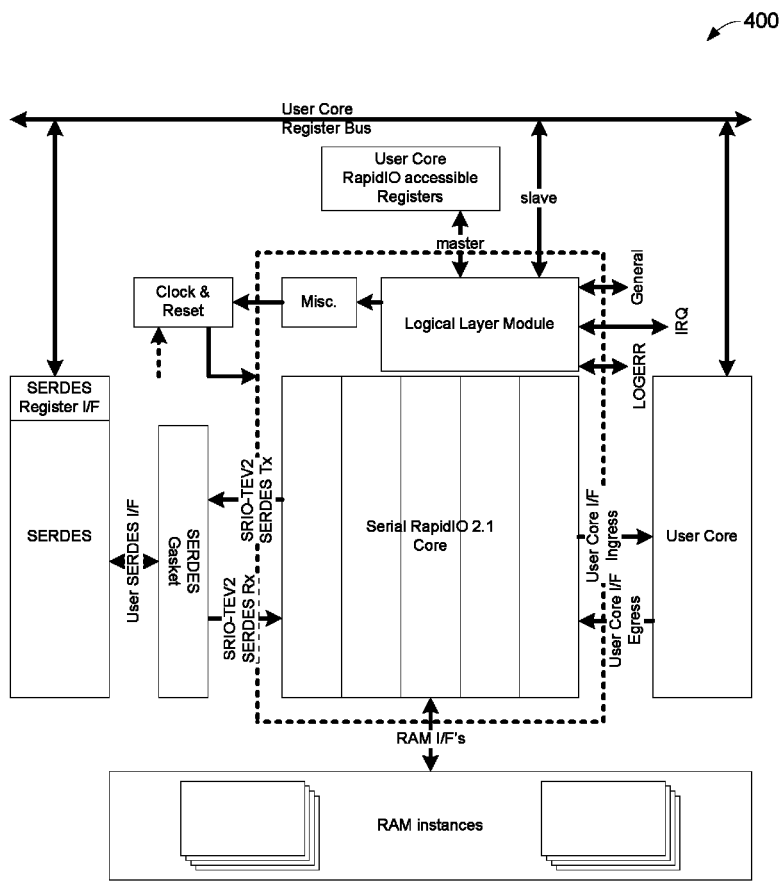
FIG. 4 illustrates one embodiment of the invention in an end-point terminating device application.

FIG. 4 illustrates, generally at 400, one embodiment of the invention in an end-point terminating device application.

Figure 5:
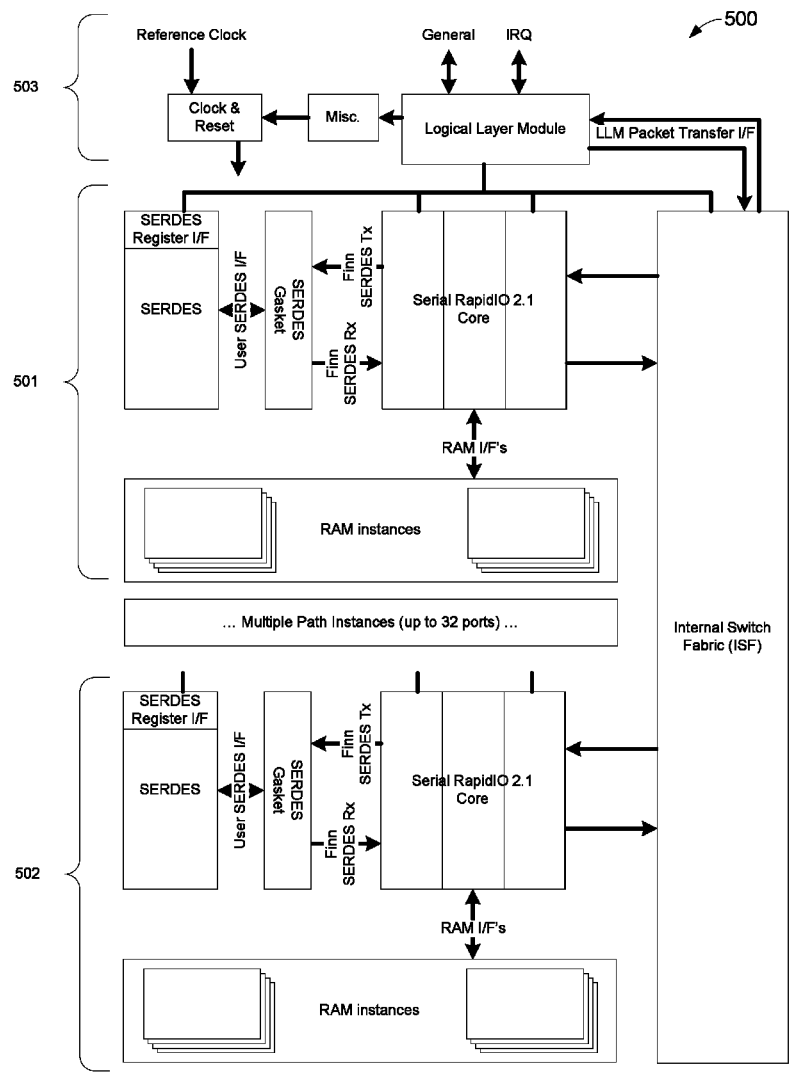
FIG. 5 illustrates one embodiment of the invention in a switch application.

FIG. 5 illustrates, generally at 500, one embodiment of the invention in a switch application. FIG. 5 shows an embodiment of the invention where there are two instance end points (501 and 502) and yet only one centralized logical layer (503). One of skill in the art will appreciate that more than two instances of end points can be controlled by one centralized logical layer. Thus the end-point architecture as illustrated in FIG. 5 can scale for a switch with one centralized logical layer and multiple path instances.

Figure 6:
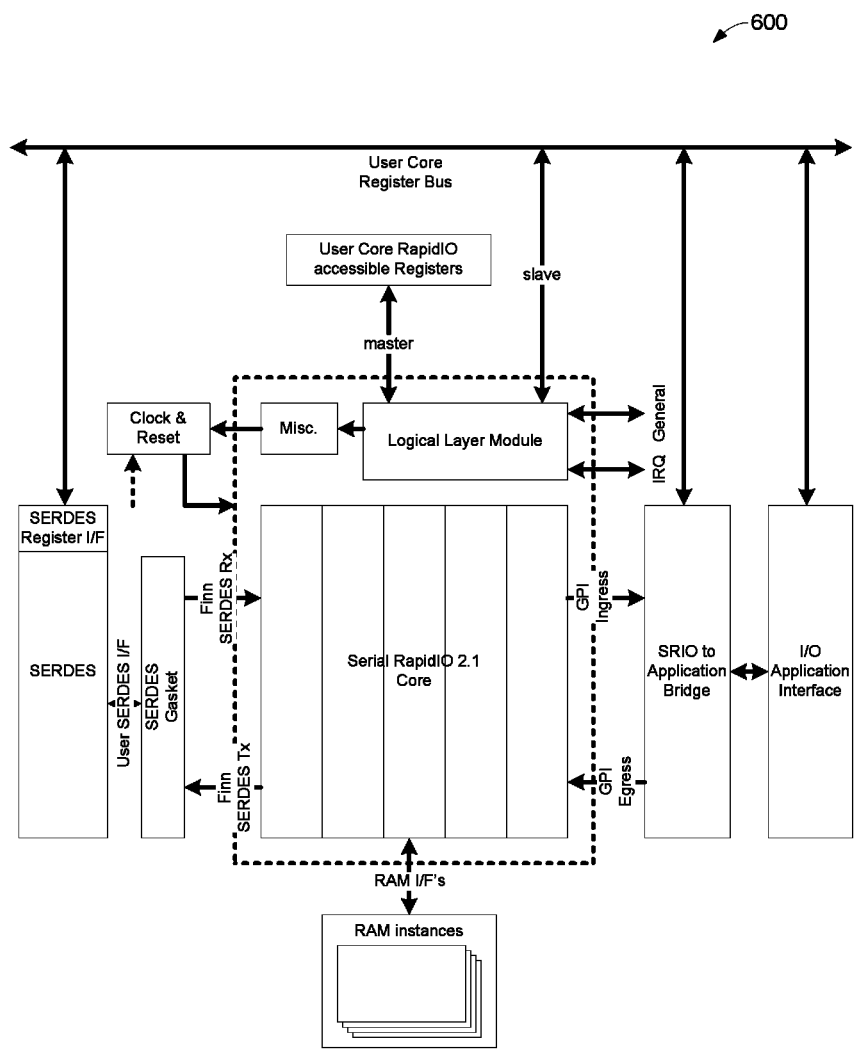
FIG. 6 illustrates one embodiment of the invention in a bridging application.

FIG. 6 illustrates, generally at 600, one embodiment of the invention in a bridging application.

In one embodiment of the invention, ingress packet routing is based on FTYPE/TTYPE in the transport layer inbound packet filter.

In one embodiment of the invention, packet steering is based on FTYPE and TTYPE.

Figure 18:
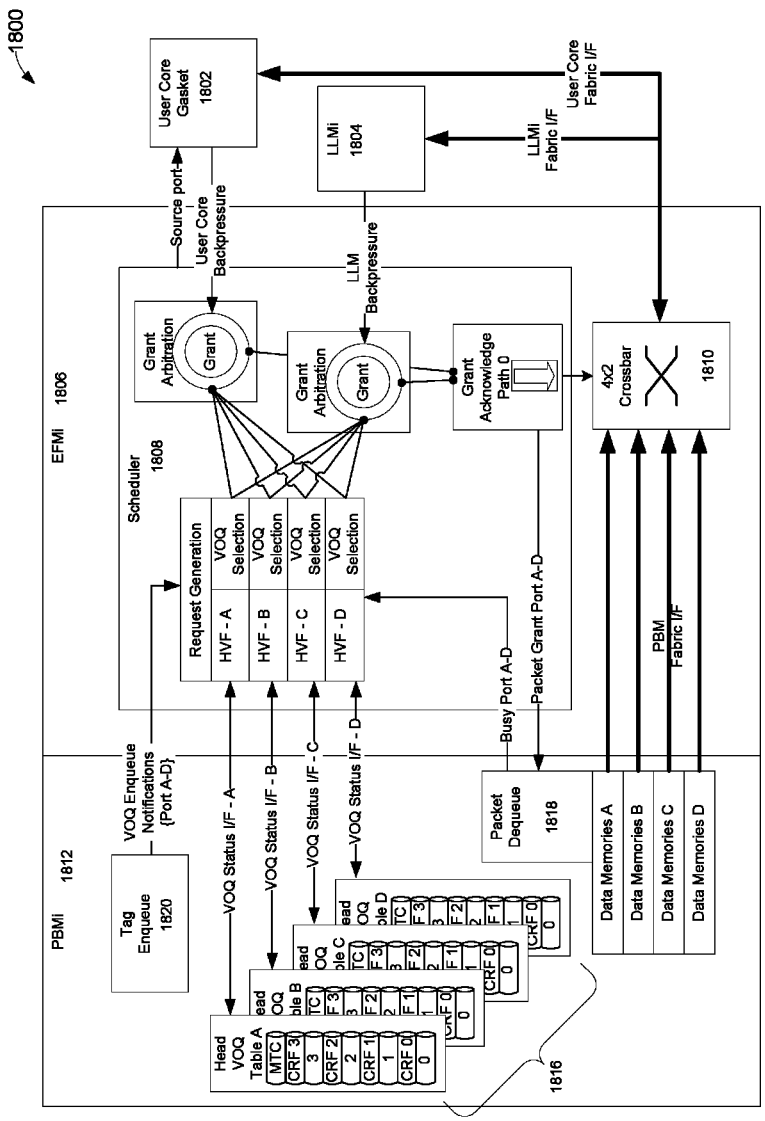
FIG. 18 illustrates one embodiment of the invention showing an End Point Fabric Module (Ingress)

In one embodiment of the invention, up to 8+1 VOQs are allocated with 1 VOQ allocated to logical layer packet and 8 VOQs allocated for other purposes. For example, 8 VOQs may be allocated for 1802 User Core Gasket as illustrated in FIG. 18, and 1 VOQ may be allocated for 1804 LLMi as illustrated in FIG. 18.

In one embodiment of the invention, TLMi selects the VOQ(s) for packet storage. For example, but not limited to, in one embodiment the TLMi selects the VOQ(s) for packet storage for endpoints and select is on {Priority, Critical-Request Flow} (flowID). In one embodiment the TLMi selects the VOQ(s) for packet storage for switches and select is on flowID and Destination Port. In one embodiment the TLMi selects the VOQ(s) for packet storage for bridges and select is on select on FType and TType. One of skill in the art will appreciate that select may be based on other combinations as well.

In one embodiment of the invention, TLMi responds to per flowID backpressure to trigger Packet-Retry.

In one embodiment of the invention, flowID which is composed of {Priority, Critical-Request Flow} is a 3 bit field, 2 bits for the Priority, and 1 bit for the Critical-Request Flow.

Figure 7B:
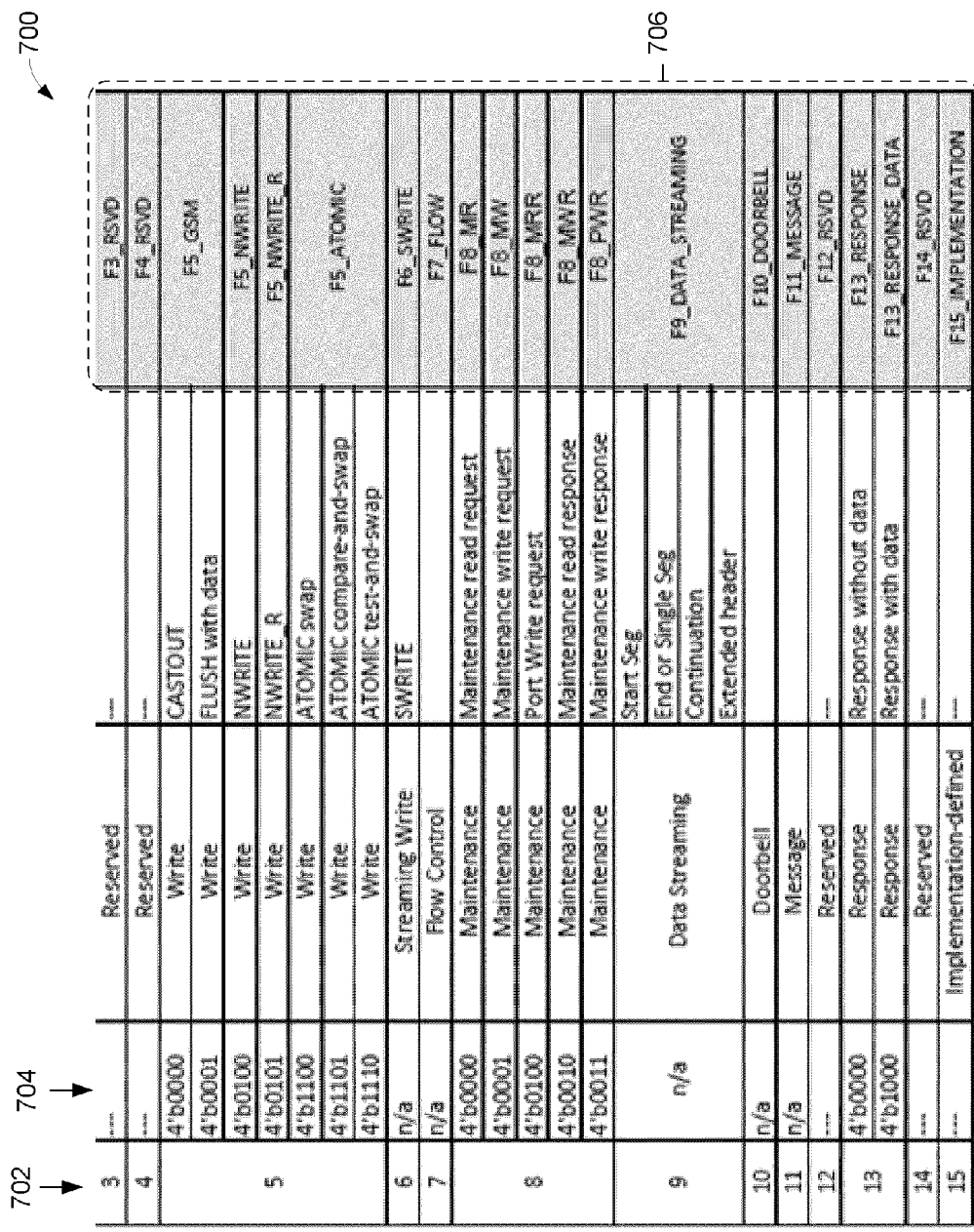

FIG. 7A illustrates, generally at 700, part of an FType 702 and TType 704 enqueue operation summary for a bridge packet routing based on Ftype and Ttype. Note that TTypes that are not listed are reserved. For example, FIGS. 7A and 7B illustrate one embodiment of the invention showing bridge packet routing based on FType and TType.

FIG. 7B illustrates, generally at 700, part of an FType 702 and TType 704 enqueue operation summary for a bridge packet routing based on Ftype and Ttype. Note that TTypes that are not listed are reserved.

Figure 22A:
FIG. 22A, and FIG. 22B illustrate one embodiment of the invention showing an FType and TType operation summary.
Figure 22B:

In one embodiment of the invention, for example as illustrated in FIG. 7A and FIG. 7B, the corresponding VOQ numbers for VOQ allocation for different Packet Types may be as illustrated in FIG. 21, FIG. 22A, and FIG. 22B and described in the corresponding paragraphs in the specification.

In one embodiment of the invention, for example as illustrated in FIG. 7A and FIG. 7B, the register fields as noted at 706 which control enqueue to which VOQ are configurable. For example, in FIG. 7A, F2_GSM could be configured to include what is denoted currently as F2_READ.

In one embodiment of the invention, inbound packet filtering is done in the TLMi. For example, the inbound packet filter identifies packets using FTYPE/TTYPE for which the user may require special handling. In one embodiment of the invention, the filter performs the following operations:

1) The RapidIO TLM Port {0 . . . 3} Ftype Filter Control Register provides a control bit for groups of Ftype/Ttype combinations to cover the full 256 combinations for Ftype and Ttype (see for example, FIG. 7A and FIG. 7B). If the control bit for a packet's Ftype/Ttype is not set, no filtering action is taken.

2) For those packets that meet the above criteria at 1), the packet is acknowledged at the Physical layer, but the packet is not enqueued to the PBMi. The packet discard due to unsupported request is reported to RapidIO Local/Transport Layer Error Detect CSR.ILL_TYPE.

In one embodiment of the invention, an Inbound Port Map Block may be used for terminating EP and Bridge in applications. For example, the Inbound Port Map Block provides packet admission control and routing for ingress packets. Inbound packets that are admitted are routed to VOQs in the PBMi according to their destID, PRIO, CRF, FType and TType.

In one embodiment of the invention there is configurable and scalable dynamic buffering.

For example, in one embodiment of the invention different packet buffering schemes are supported. For example, in one embodiment of the invention, for the Ingress Packet buffer a water-mark based on buffering to sustain throughput up to the line rate of the interface (e.g. 20 Gbps) with 32 byte granularity is supported. For example, in one embodiment of the invention, for the Egress packet buffer a novel circular re-order queue based on buffering is used to ensure packets routing with respect to RapidIO ordering rules while at the same time reducing latency.

In one embodiment of the invention, both ingress and egress buffers support a) 8/16/32 max sized packets for 1x/2x/4x ports, b) maximum 72/144/288 packets (Ingress), and c) maximum 64 packets (Egress).

In one embodiment of the invention, Enqueue back-pressure (e.g. towards SRIO link partner) is provided. In one embodiment of the invention, Enqueue backpressure is provided by PBMi to control admission of new packets into the packet buffer. The watermark based backpressure is provided to indicate on a per-port per flowID (Priority 3 bit and CRF 1 bit) basis which allows PBMi to store a packet of a specific flowID. As packets are enqueued and dequeued, PBMi keeps track of the buffer resources consumed by packet enqueue and packet dequeue. When the amount of resources used rises above the programmable watermarks, backpressure is asserted for the associated flowID(s).

Figure 8:
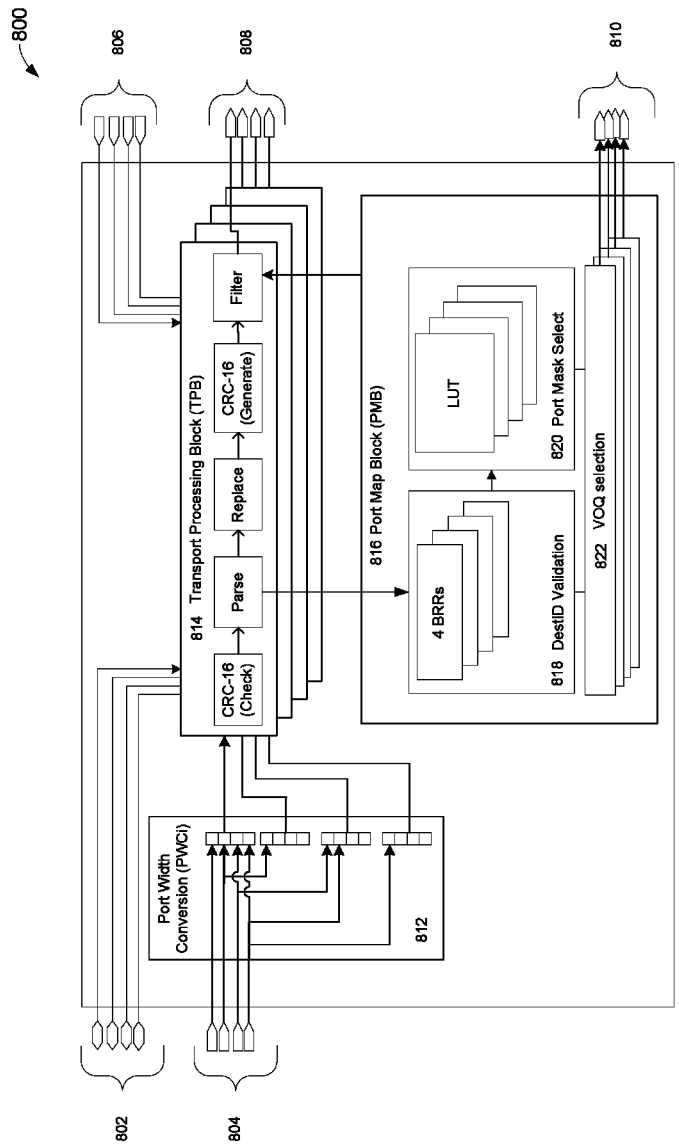
FIG. 8 illustrates one embodiment of the invention showing a Transport Layer Block Diagram.

FIG. 8 illustrates, generally at 800, one embodiment of the invention showing a Transport Layer Block Diagram. For illustration purposes, FIG. 8 shows four ports. At 802 are To/From Ingress Physical Layer, Packet Acknowledgment, and Packet Control. At 804 are From Ingress Physical Layer Packet Data (16-bit shown) and Control information for example, but not limited to, SoP, EoP, STOMP, DataValid. At 806 are Back Pressure from PBM on a per FlowID per Channel basis. At 808 are Per portPacket Data (64-bit) and Control information, for example, but not limited to SoP, EoP, STOMP, DataValid. At 810 are Enqueue Interface to PBMi, FlowID, and Port_Mask. At 812 is a Port Width Conversion (PWC) for ingress (PWCi) (as noted for 4 ports). At 814 is a Transport Processing Block (TPB) (again 4 of them). At 816 is a Port Map Block (PMB). Transport Processing Block (TPB) 814 has for each of the ports a CRC-16 (Check), a Parse, a Replace, a CRC-16 (Generate), and Filter block. Port Map Block (PMB) 816 has for each port a 818 DestID Validation (BRR (Base Routing Register)), a Port Mask Select 820 (LUT (Look Up Table)), and a VOQ selection 822.

Figure 9:
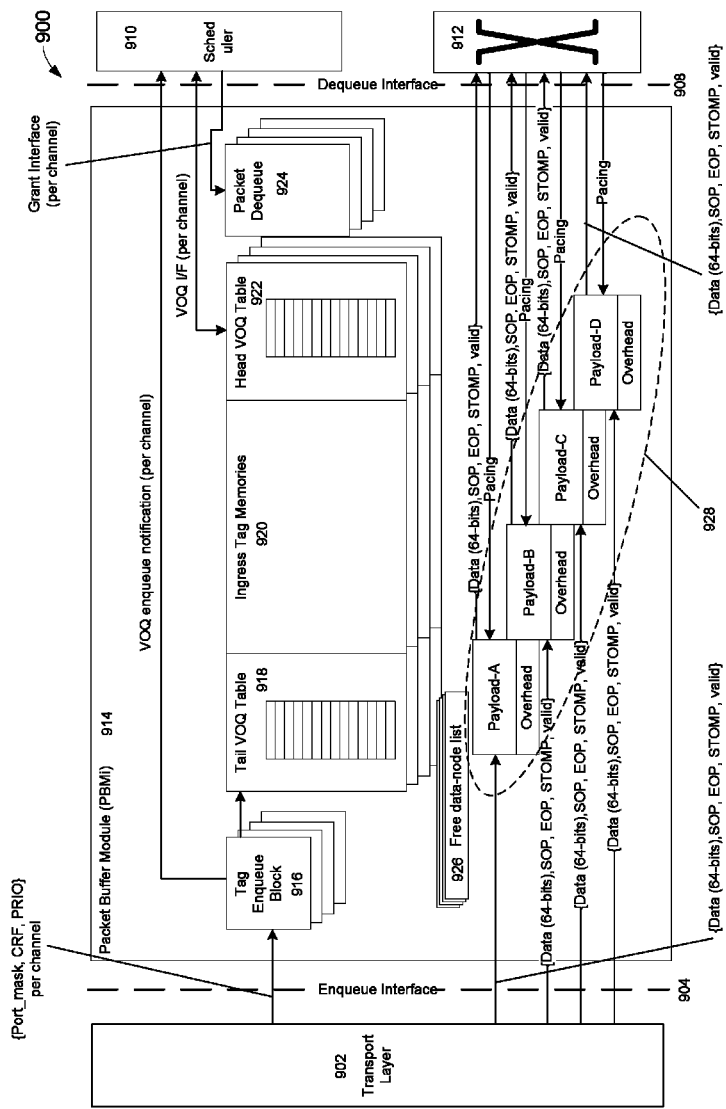
FIG. 9 illustrates one embodiment of the invention showing a Packet Buffer Module (PBM) for Ingress (PBMi)

FIG. 9 illustrates, generally at 900, one embodiment of the invention showing a Packet Buffer Module (PBM) for Ingress (PBMi). At 902 is a Transport Layer. At 904 is an Enqueue Interface. At 906 is a Dequeue Interface. At 910 os a Scheduler, and at 912 a Switch Fabric. At 914 is a Packet Buffer Module (PBMi) for Ingress. At 916 is a Tag Enqueue Block (one for each of 4 ports (A, B, C, D)). At 918 is a Tail VOQ Table, and at 920 are Ingress Tag Memories, and at 922 us a Head VOQ Table, again one for 4 ports as shown is a cascaded block fashion). At 924 is a Packet Dequeue (one for each of the 4 ports). At 926 is a Free data-node (a 32-byte quantum of data) list (again one for each of the 4 ports). At 928 are shown Payload for A, B, C, D (e.g. for A Payload-A), and associated Overhead.

In one embodiment of the invention, an Ingress Packet Buffer Module (PBMi) queues packet data in VOQs. In one embodiment, One VOQ is dedicated for the LLM. In one embodiment, others VOQs are grouped in Port-groups of 8 VOQs. In one embodiment there is one Port-group per egress port. In one embodiment there is one Port-group per egress port.

In one embodiment of the invention, the VOQ is selected by the TLMi.

In one embodiment of the invention, multicast is enqueued to multiple VOQs. This minimizes blocking.

In one embodiment of the invention, backpressure is per FlowID.

In one embodiment of the invention, there are programmable watermarks.

In one embodiment of the invention, the Ingress Packet Buffer Module provides per-packet Time-to-Live support.

In one embodiment of the invention, RAM (Random Access Memory) is dedicated to each channel. In one embodiment of the invention, the RAM bifurcates as a Path is bifurcated. In one embodiment of the invention, there are independent enqueue/dequeue per channel.

In one embodiment of the invention, RAM is managed on Data Nodes. In one embodiment of the invention the managed RAM support each data node with 32-bytes plus any Over-Head.

In one embodiment of the invention, packet storage is limited only by the number of Data Nodes and the number of Tags.

Figure 10:
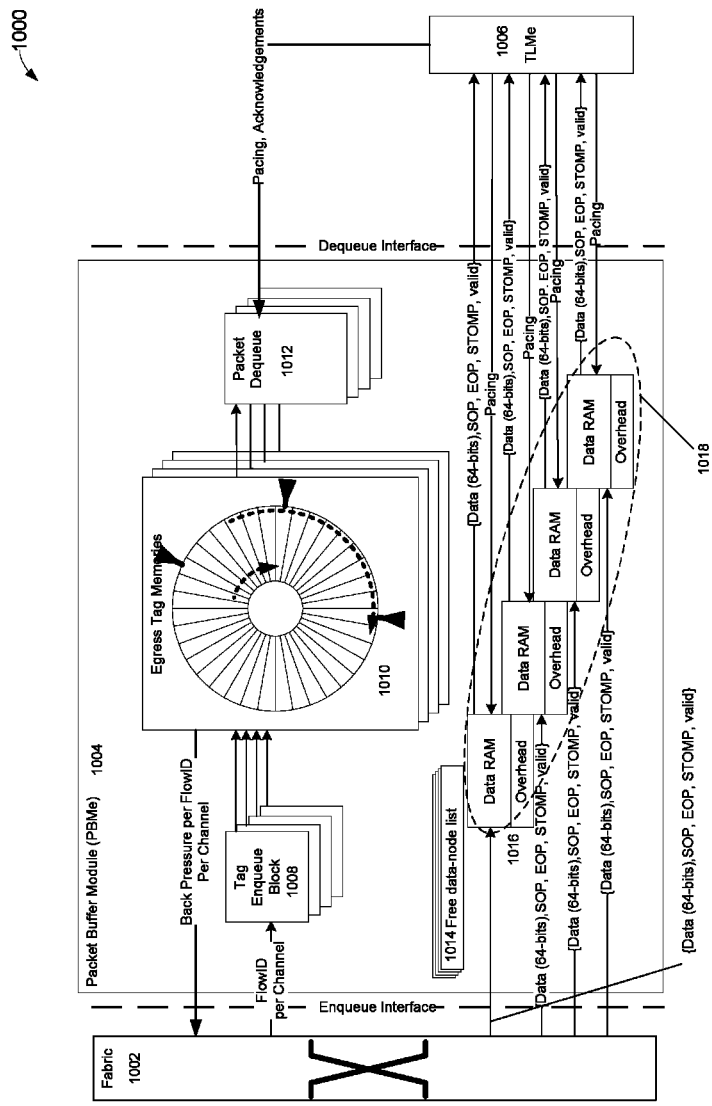
FIG. 10 illustrates one embodiment of the invention showing a Egress Packet Buffer Module (PBMe)

FIG. 10 illustrates, generally at 1000, one embodiment of the invention showing a Egress Packet Buffer Module (PBMe). At 1002 is Fabric (e.g. Switch Fabric). At 1004 is the Packet Buffer Module (PBMe) block. At 1006 is the TLMe block. At 1008 is a Tag Enqueue Block (one for each of 4 ports as shown cascaded). At 1010 are Egress Tag Memories (again one for each port) shown here as a CRQ. At 1012 is a Packet Dequeue (again one for each port). At 1014 is a Free data-node list (one for each port). At 1018 are shown each of the four separate Data RAM and Overheard for each of the ports. For example, at 1016 are shown the Data RAM and Overhead for a first port (e.g. A). What is to be appreciated is that for each port there are associated blocks that are functionally tied together. For example, if we use 1016 as an example, there is associated and in communication with it (not shown in FIG. 10 so as to avoid confusing the diagram) 1008, 1010, 1012, and 1014. That is, Data RAM and Overhead 1016 is in communication with 1008 Tag Enqueue Block, 1010 Egress Tag Memories, 1012 Packet Dequeue, and 1014 Free data-node list which are all in communication with each other to handle all operations associated with that port (e.g. Port A in this example).

In one embodiment of the invention, the Egress Packet Buffer Module (PBMe) queues packet data in the CRQs (Circular Reordering Queues).

In one embodiment of the invention, the Circular Reordering Queue maintains the arrival order of packets.

In one embodiment of the invention, the Circular Reordering Queue allows reordering under user control. For example, but not limited to, reordering under user control based on packet retry, reordering under user control based on Packet-not-Accepted, reordering under user control based on Always (Oldest-Highest-Priority First), etc.

In one embodiment of the invention, the Egress Packet Buffer Module (PBMe) allows backpressure per FlowID.

In one embodiment of the invention, the Egress Packet Buffer Module (PBMe) has programmable watermarks for triggering backpressure.

In one embodiment of the invention, the Egress Packet Buffer Module (PBMe) provides packet discard based on per-packet Time-to-Live (TTL) timers. The TTL timer is started when the packet is enqueued in the PBMi.

In one embodiment of the invention, the Egress Packet Buffer Module (PBMe) has RAM dedicated to each channel. In one embodiment of the invention, the Egress Packet Buffer Module RAM bifurcates as the Path is bifurcated. In one embodiment of the invention, the Egress Packet Buffer Module there are independent enqueue/dequeue per channel.

In one embodiment of the invention, the Egress Packet Buffer Module (PBMe)

In one embodiment of the invention, the Egress Packet Buffer Module (PBMe) RAM is managed based on Data Nodes. For example, but not limited to, one embodiment of the PBMe uses 32-bytes plus OverHead per data node.

In one embodiment of the invention, the Egress Packet Buffer Module (PBMe) packet storage limited by the number of Data Nodes. In one embodiment of the invention, the Egress Packet Buffer Module (PBMe) packet storage is limited by the number the number of CRQ entries. For example, in one embodiment of the PBMe there are 64 CRQ entries which is fewer than the number of Data Nodes and thus limits the packet storage.

Figure 11:
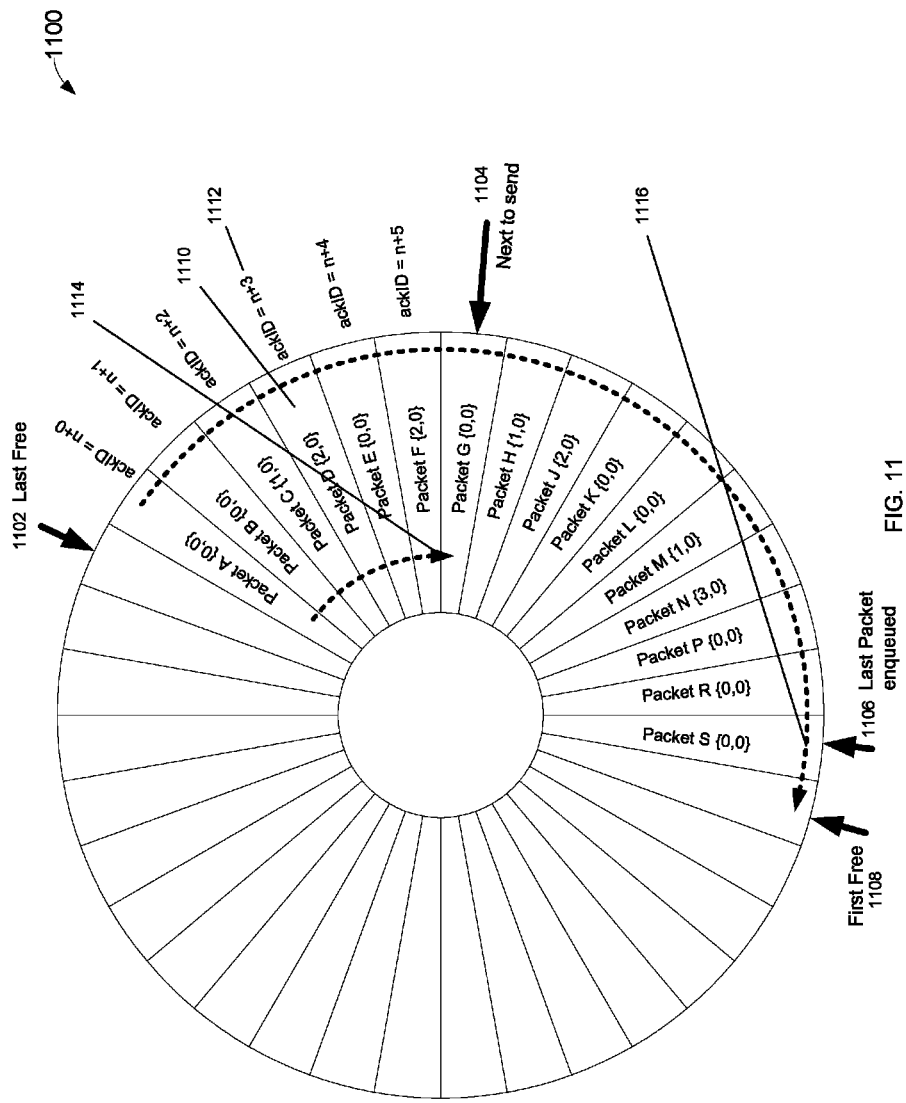
FIG. 11 illustrates one embodiment of the invention showing the circular re-order queue (CRQ)

FIG. 11 illustrates, generally at 1100, one embodiment of the invention showing the CRQ. At 1102 is a Last Free pointer to an open location. At 1104 is a pointer to Next to send. At 1106 is a pointer to the Last Packet enqueued. At 1108 is a pointer to a First Free location. Shown are packets and the ackID associated with each. For example, 1110 shows Packet D {2,0} and the associated ackID=n+3 at 1112. At 1114 is a clock-wise dequeue arrow. At 1116 is a clock-wise enqueue arrow.

In one embodiment of the invention, the CRQ replaces the Tags, and VOQ tables.

In one embodiment of the invention, the CRQ Packets are enqueued in order. For example, in FIG. 11 the CRQ packets are enqueued in order clock-wise as shown by the arrow at 1116.

In one embodiment of the invention, the CRQ Packets are dequeued in order and AckIDs are assigned on dequeue. For example, in FIG. 11 the CRQ packets are dequeued in clock-wise order and AckIDs are assigned on dequeue in clock-wise order as shown by the arrow at 1114.

In one embodiment of the invention, the CRQ Packet Accept frees one packet. For example, in FIG. 11 the CRQ Packet Accept Free pointer moves one 1 step clock-wise.

In one embodiment of the invention, the CRQ on Packet Retry moves 'Next-to-Send' (also denoted Next to send) at 1104 back to the first packet. By doing this the CRQ eliminates outstanding unacknowledged packets and forces a re-order event.

In one embodiment of the invention, the CRQ in response to a Link-Response may move both 'Free' (e.g. 1102 and/or 1108) and 'Next-to-Send' 1104 pointers.

Figure 12:
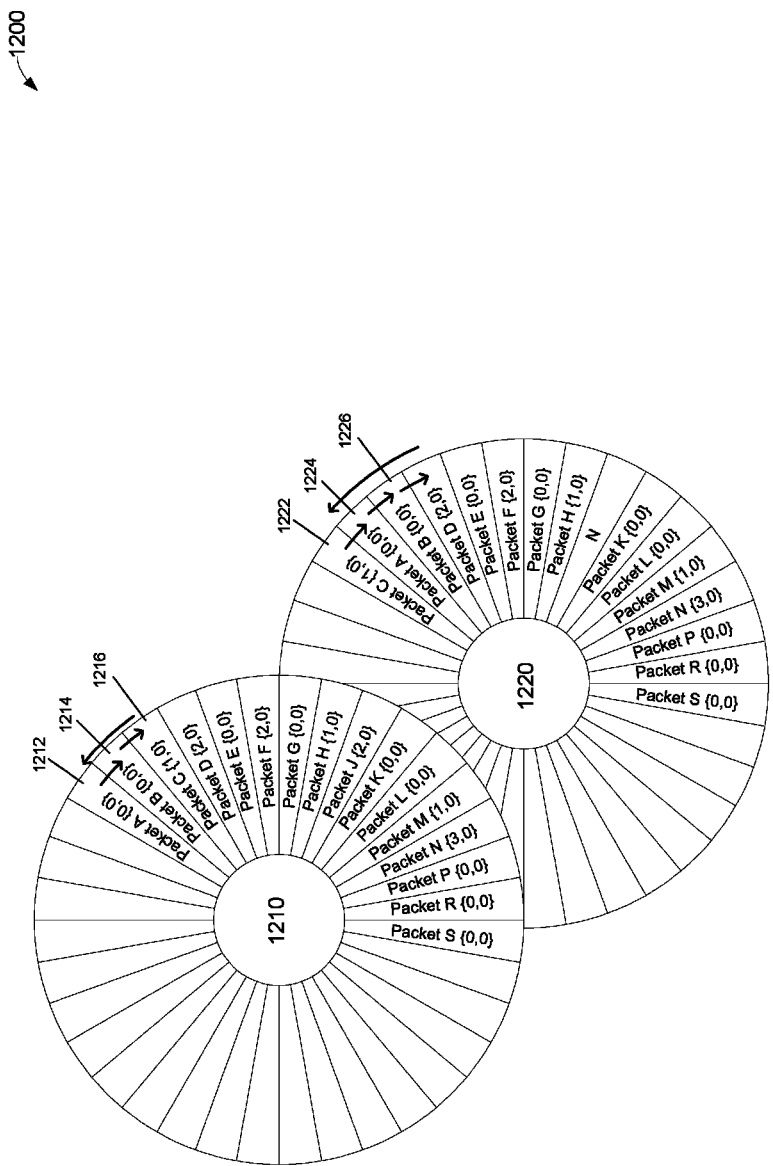
FIG. 12 illustrates one embodiment of the invention showing CRQ reordering.

FIG. 12 illustrates, generally at 1200, one embodiment of the invention showing CRQ reordering. At 1210 is one state of the CRQ before reordering and at 1220 is a second state of the CRQ after reordering. As can be seen at CRQ 1210 before reordering: 1212 is Packet A {0,0}, followed by Packet B {0,0} at 1212, which is followed by 1216 Packet C {1,0}.

After reordering of CRQ 1210 we have the CRQ as shown at 1220. As can be seen at CRQ 1220 after reordering the order of the packets is: first is 1222 Packet C, which is followed by 1224 Packet A {0,0}, which is followed by 1226 Packet B {0,0}. As can been seen from 1210 to 1220, Packet C {1,0} has been reordered from third 'place' in CRQ 1210 to first 'place' in CRQ 1220 (i.e. in CRQ 1220 is has been brought to the front of the CRQ).

In one embodiment of the invention CRQ reordering brings a higher FlowID packet to the front of the CRQ.

In one embodiment of the invention CRQ reordering brings a higher FlowID packet to the front of the CRQ by pushing all other packets back one step.

In one embodiment of the invention CRQ reordering supports two programmable modes. For example, one mode is a Higher mode which is shown in FIG. 12 and promotes any packet with a higher FlowID.

Figure 13:
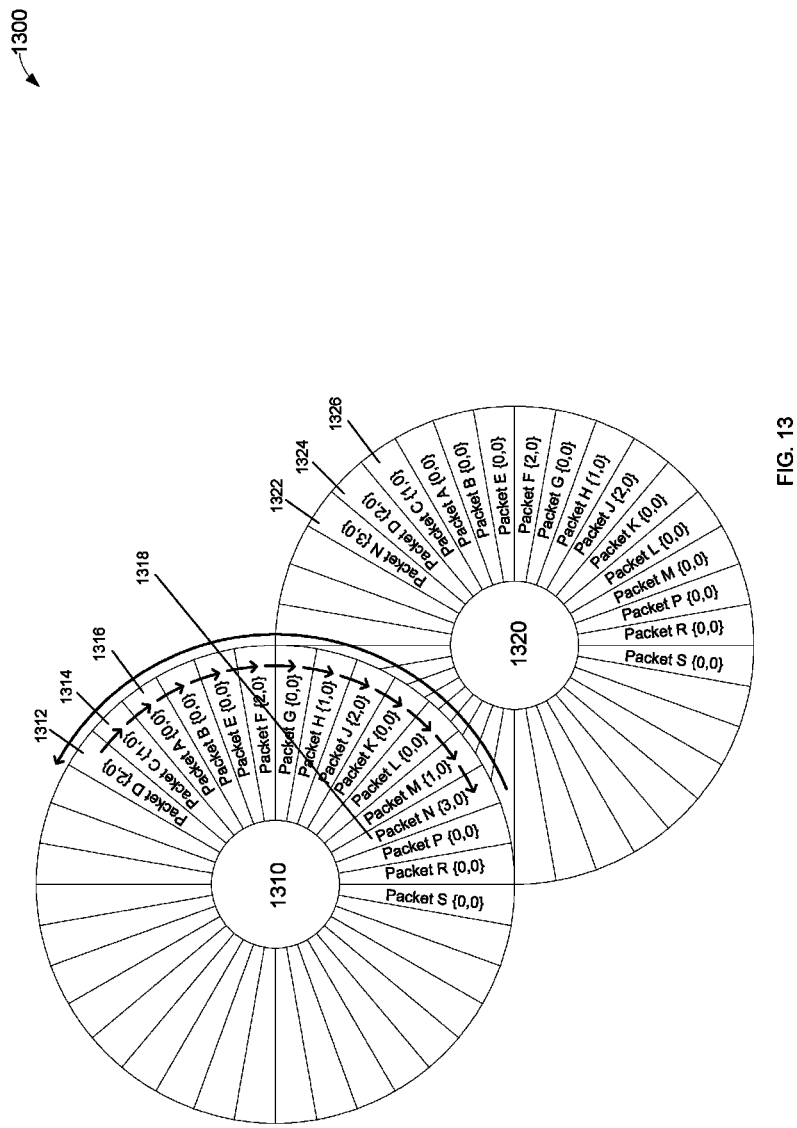
FIG. 13 illustrates one embodiment of the invention showing CRQ reordering.

FIG. 13 illustrates, generally at 1300, one embodiment of the invention showing CRQ reordering.

In one embodiment of the invention CRQ reordering supports two programmable modes. For example, a second mode is a Highest mode which is shown in FIG. 13 and promotes the oldest highest FlowID packet. For example, in the embodiment illustrated in FIG. 13, the CRQ reordering would promote packet 'N' on first retry. And in one embodiment of the invention the CRQ reordering would keep packet 'N' at head on second retry. At the CRQ 1310 is seen the order of the packets before reordering being 1312 Packet D {2,0}, then next 1314 Packet C {1,0}, then next Packet A {0,0}, and much further down the order 1318 Packet N {3,0}. After reordering as shown at CRQ 1320, the first three packets in order are 1322 Packet N {3,0}, then packet 1324 Packet D {2,0}, then packet 1326 Packet C {1,0}. The arrows (not labeled) toward the center of the CRQ 1310 indicate figuratively the shifting of the packets while the large arrow (not labeled) outside CRQ 1310 figuratively shows the shifting of Packet N {3,0} to the head of the CRQ queue as shown (i.e. at the head of the queue as shown in CRQ 1320 at position 1322).

Figure 14A:
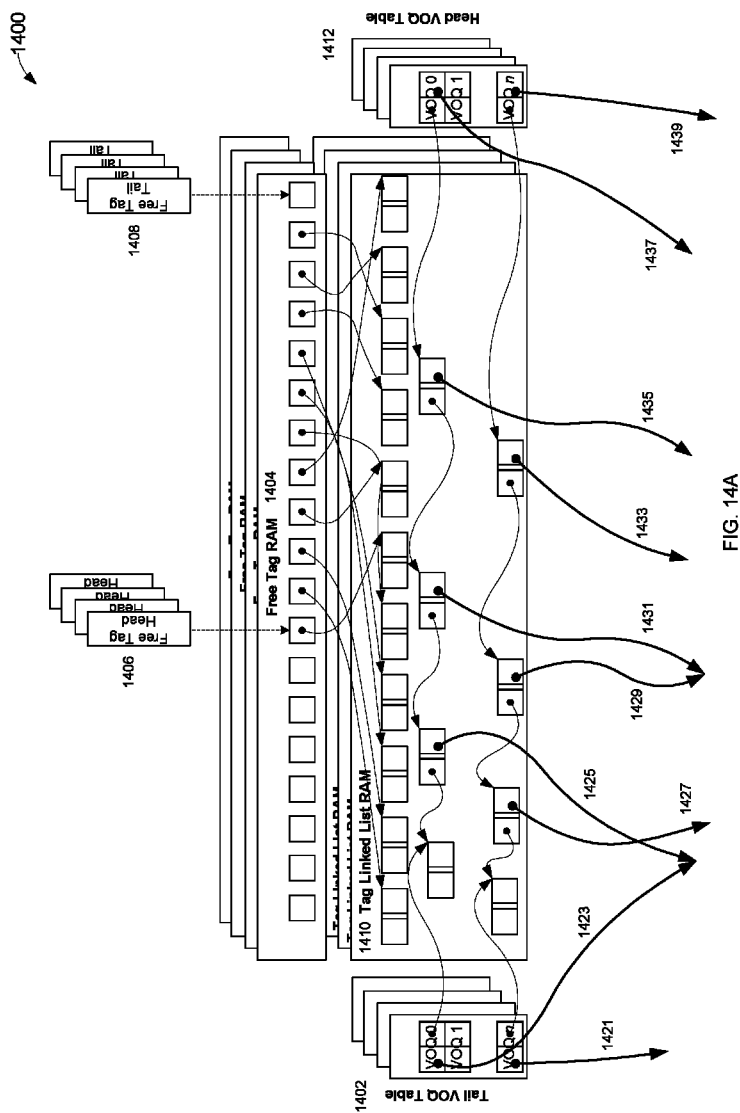
FIG. 14A, and FIG. 14B illustrate one embodiment of the invention showing the Ingress VOQ Structure.
Figure 14B:
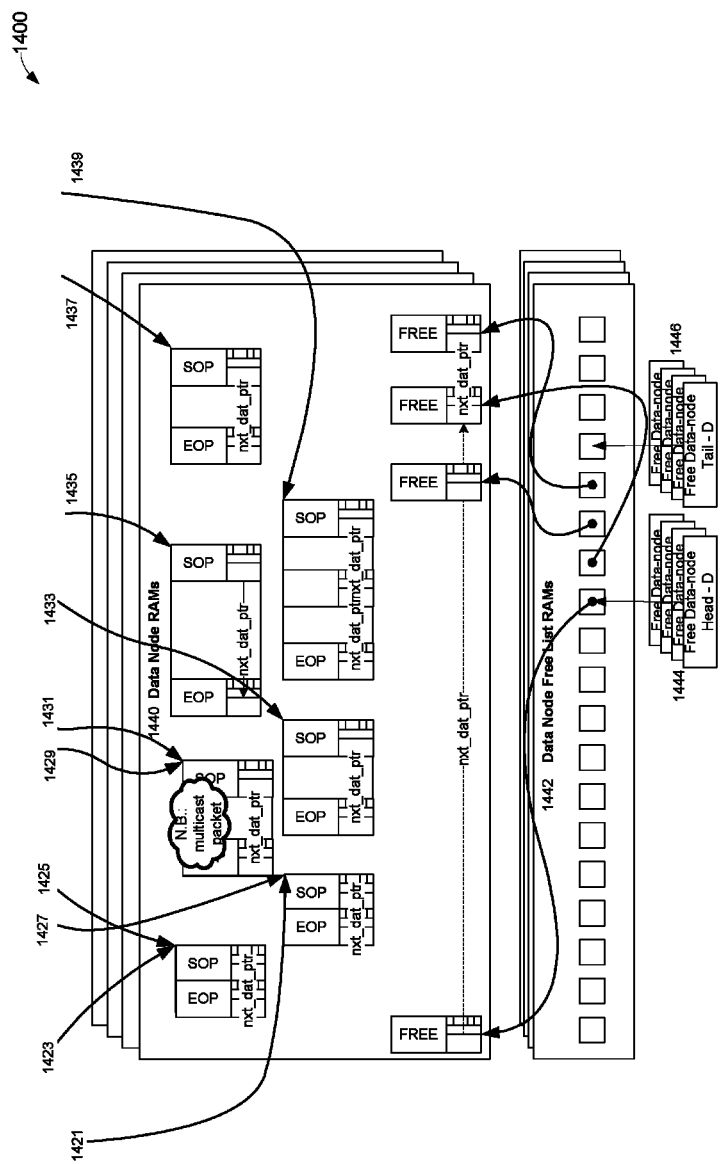

FIG. 14A illustrates, generally at 1400, one part of an embodiment of the invention showing the Ingress VOQ Structure. At 1402 is Tail VOQ Table. As shown at 1402 the cascaded boxes show 4 ports. Each Tail VOQ Table has VOQ 0, VOQ 1, through VOQ n. At 1404 is shown Free Tag RAM (again for 4 ports). At 1406 Free Tag Head and at 1408 Free Tag Tail associated with Free Tag RAM 1404. At 1410 is Tag Linked List RAM (again for each of 4 ports). At 1412 is Head VOQ Table. As shown at 1412 the cascaded boxes show 4 ports. Each Head VOQ Table has VOQ 0, VOQ 1, through VOQ n. Shown by arrows are numerous examples of linking. Arrows 1421, 1423, 1425, 1427, 1429, 1431, 1433, 1435, 1437, and 1439 go to various points in a Data Node Linked List RAMs 1440 as shown in FIG. 14B.

In one embodiment of the invention, the Ingress VOQ Structure Tail VOQ Table (e.g. 1402 in FIG. 14A) tracks the 'youngest' packet in each VOQ. In one embodiment of the invention, the Tail VOQ Table (e.g. 1402 in FIG. 14A) is used to enqueue a new tag to a VOQ.

In one embodiment of the invention, the Ingress VOQ Structure Head VOQ Table (e.g. 1412 in FIG. 14A) tracks the 'oldest' packet in each VOQ. In one embodiment of the invention, the Head VOQ Table (e.g. 1412 in FIG. 14A) is used by the scheduler to dequeue packets.

In one embodiment of the invention, the Free Tag RAM (e.g. 1404 in FIG. 14A) tracks free Tags.

FIG. 14B illustrates, generally at 1400, one part of an embodiment of the invention showing the Ingress VOQ Structure. Arrows 1421, 1423, 1425, 1427, 1429, 1431, 1433, 1435, 1437, and 1439 come from various points as shown in FIG. 14A. At 1440 is Data Node RAMs (again shown for 4 ports via the cascaded boxes). At 1442 is Data Node Free List RAMs (again shown for 4 ports via the cascaded boxes). At 1444 is Free Data-node Head-D (for 4 ports), and at 1446 is Free Data-node Tail-D (for 4 ports), both as associated with 1442 Data Node Free List RAMs. Shown by the arrows (some not labeled) and boxes are the linking and EOP, SOP, FREE, nxt_dat_ptr (next data pointer), multicast packet, etc.

In one embodiment of the invention, for example, as illustrated in FIG. 14B, 1442 the Data Node Free List RAMs tracks free Data Nodes.

Figure 15:
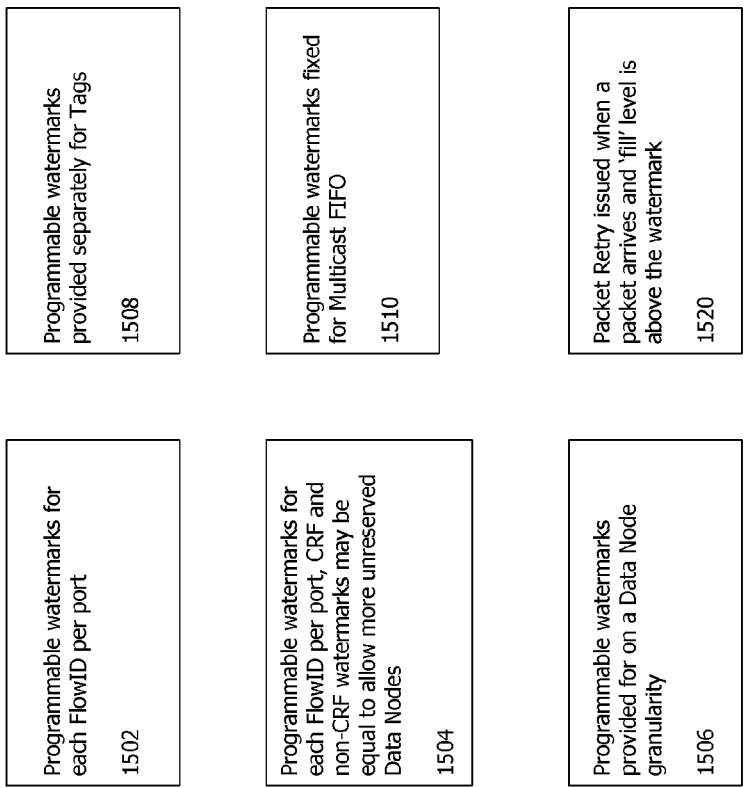
FIG. 15 illustrates embodiments of the invention showing how Ingress Back Pressure is achieved and packet retry.

FIG. 15 illustrates, generally at 1500, embodiments of the invention showing how Ingress Back Pressure is achieved and packet retry.

In one embodiment of the invention, there are Programmable watermarks for each FlowID per port 1502. In one embodiment of the invention, there are programmable watermarks for each FlowID per port, and additionally CRF and non-CRF watermarks may be set equal to allow more unreserved Data Nodes 1504. In one embodiment of the invention, programmable watermarks provided for on a Data Node granularity level 1506.

In one embodiment of the invention, programmable watermarks are provided separately for Tags 1508. In one embodiment of the invention, programmable watermarks may be fixed for Multicast FIFO 1510. In one embodiment of the invention, a Packet Retry is issued when a packet arrives and the level is above the watermark 1520.

Figure 16:
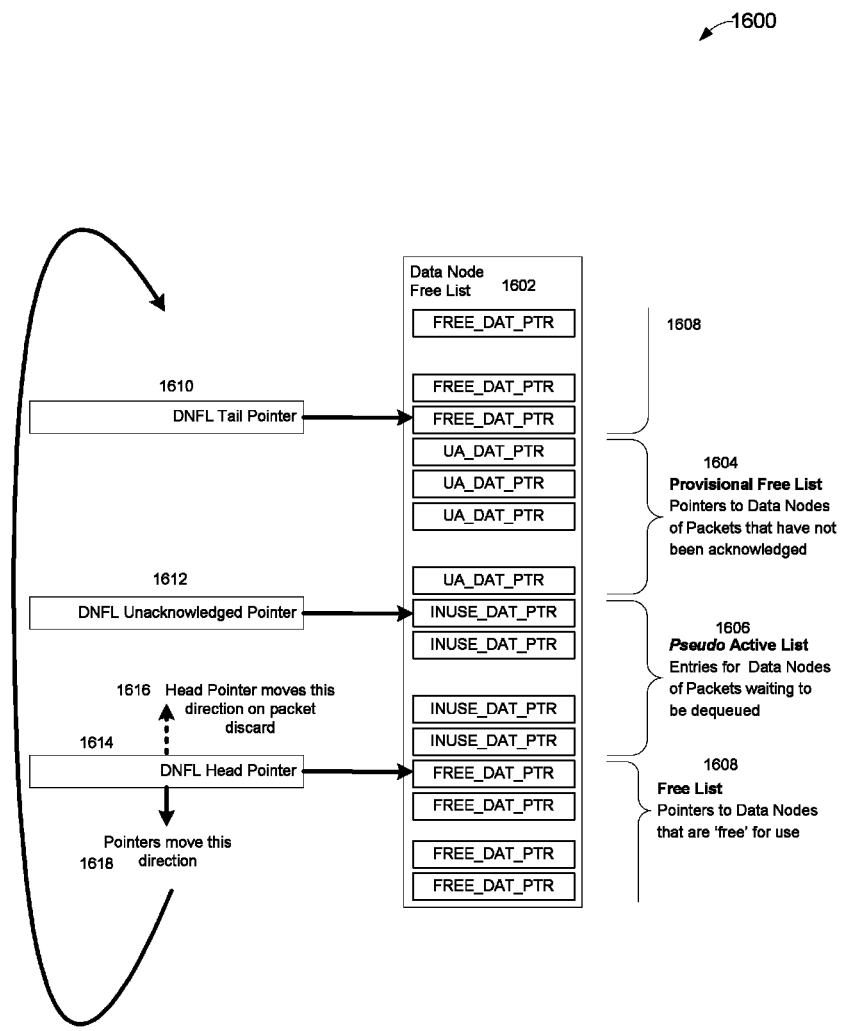
FIG. 16 illustrates an embodiment of the invention showing Freeing Data Nodes.

FIG. 16 illustrates, generally at 1600, an embodiment of the invention showing Freeing Data Nodes. At 1602 is a Data Node Free List (DNFL). 1602 shows FREE_DAT_PTR (free data pointers), UA_DAT_PTR (unacknowledged data pointers), and INUSE_DAT_PTR (in use data pointers). At 1604 are shown Provisional Free List—Pointers to Data Nodes of Packets that have not been acknowledged. At 1606 are shown Pseudo Active List-Entries for Data Nodes of Packets waiting to be dequeued. At 1608 are shown Free List-Pointers to Data Nodes that are 'free' for use (note that as illustrated here, Free List wraps from the bottom of the 1602 box to the top of the 1602 box). 1610 denotes the DNFL Tail Pointer. 1612 denotes the DNFL Unacknowledged Pointer. 1614 denotes the DNFL Head Pointer. At noted at 1616 the Head Pointer moves this direction on packet discard. And as noted to 1618 Pointers move this direction.

In one embodiment of the invention, with regard to freeing data nodes, PBMi Data Nodes are Freed on dequeue one-by-one.

In one embodiment of the invention, with regard to freeing data nodes, PBMe must wait for PA (Packet Acknowledgements) before freeing Data Nodes.

In one embodiment of the invention, with regard to freeing data nodes, CRQ tracks unacknowledged packets.

In one embodiment of the invention, with regard to freeing data nodes, DNFL tracks Data Nodes of unacknowledged packets.

In one embodiment of the invention, with regard to freeing data nodes, for example as shown in FIG. 16, Packet Acknowledgements move the pointers.

In one embodiment of the invention, with regard to freeing data nodes, for example as shown in FIG. 16, Packet Acknowledgements (PA) increments Tail.

In one embodiment of the invention, with regard to freeing data nodes, for example as shown in FIG. 16, Packet Retires (PR) returns DNFL-UP (DNFL Unacknowledged Pointer) to Tail (DNFL Tail Pointer).

Figure 17:
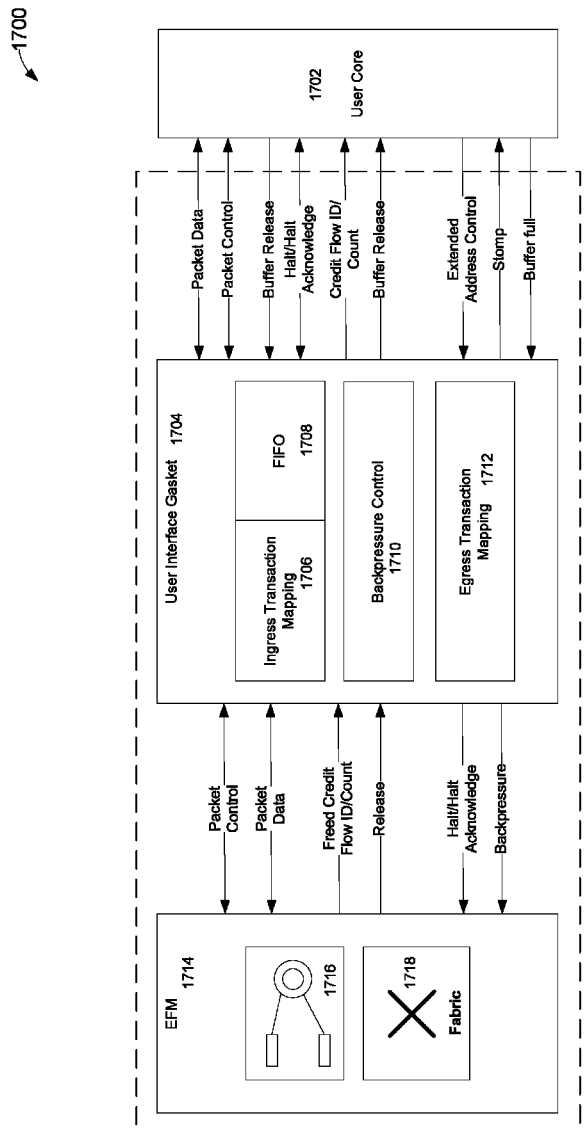
FIG. 17 illustrates an embodiment of the invention showing a Scheduler (for Packet Scheduling)

FIG. 17 illustrates, generally at 1700, an embodiment of the invention showing a Scheduler (for Packet Scheduling). The scheduler connects the packet buffer module (PBM (e.g. PBMi 312 in FIG. 3A, PBMe 390 in FIG. 3C) with the user core (e.g. USER CORE 364 in FIG. 3B). In one embodiment of the invention Ingress and Egress data-paths are supported with two separate schedulers. At 1702 is User Core. At 1704 is User Interface Gasket. Within the User Interface Gasket 1704 are 1706, 1708, 1710, and 1712. 1706 is Ingress Transaction Mapping and associated 1708 FIFO (First In First Out) memory. At 1710 is Backpressure Control. At 1712 is Egress Transaction Mapping. At 1714 is EFM (Endpoint Fabric Module) showing Arbitration 1716 and Fabric 1718. Shown but not labeled with numbers are a variety of signals as notes between blocks 1702, 1704, 1714.

In one embodiment of the invention, there is an endpoint scheduler. In one embodiment of the invention, the endpoint scheduler is capable of performance throughput up to the line rate of the interface (e.g. 20 Gbps, 60 Gbps) for 32-Byte (or larger) packets, supports up to 8+1 VOQs per port, and is capable of dequeing 2 packets simultaneously: one to User Core, one to LLM.

In one embodiment of the invention, the endpoint scheduler supports up to 4 ports from PBMi and additionally, up to 9 virtual output queues per port.

In one embodiment of the invention, the endpoint scheduler has an Ingress Scheduling Policy. In one embodiment of the invention, the Ingress Scheduling Policy is maintenance packets to LLM have highest priority. In one embodiment of the invention, the Ingress Scheduling Policy is within each port select the highest priority VOQ. In one embodiment of the invention, the Ingress Scheduling Policy is within each port select the highest priority VOQ and the oldest packet is always at the head of the VOQ. In one embodiment of the invention, the Ingress Scheduling Policy selects the port with the highest priority request. In one embodiment of the invention, the Ingress Scheduling Policy is to use Round-Robin arbitration to break ties. In one embodiment of the invention, the Ingress Scheduling Policy is to use two different grant arbiters for LLM and User Core.

In one embodiment of the invention, the endpoint scheduler has an Egress Scheduling Policy.

In one embodiment of the invention, the Egress Scheduling Policy is that the LLMe is provided access as soon as it is permitted by the User Core. In one embodiment of the invention, the Egress Scheduling Policy is Free data node information (credit) is used on a per-port per-flowID basis.

FIG. 18 illustrates, generally at 1800, one embodiment of the invention showing an End Point Fabric Module (Ingress). At 1802 is User Core Gasket. At 1804 is LLMi. At 1806 is EFMi which includes 1808 Scheduler having a variety of functions (not numerically labeled) for 4 ports and 1810 a 4×2 Crossbar (for 4 ports). At 1812 is PBMi which includes 1820 Tag Enqueue, 1816 showing the Head VOQ Table of port A, B, C, and D, 1818 Packet Dequeue and Data Memories A, B, C, and D for 4 ports.

Figure 19:
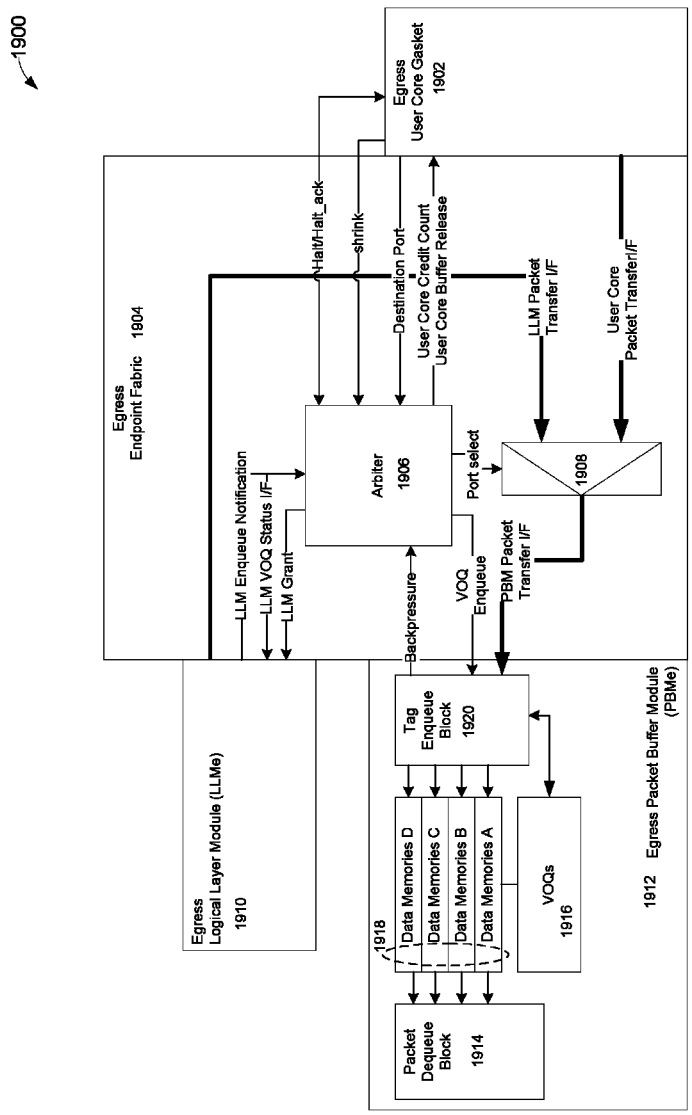
FIG. 19 illustrates one embodiment of the invention showing an End Point Fabric Module (Egress)

FIG. 19 illustrates, generally at 1900, one embodiment of the invention showing an End Point Fabric Module (Egress). At 1902 is an Egress User Core Gasket. At 1904 is an Egress Endpoint Fabric which includes 1906 Arbiter and Port Selector 1908. 1910 is an Egress Logical Layer Module (LLMe). At 1912 is Egress Packet Buffer Module (PBMe) which includes 1914 Packet Dequeue Block, 1916 VOQs, 1918 showing explicitly Data Memories A, B, C, and D for the four ports, and 1920 Tag Enqueue Block.

FIG. 20 illustrates, generally at 2000, one embodiment of the invention showing Bridge Ordering Rule and Scheduling for Dequeue operations with backpressure. The table in FIG. 20 is read in the following manner. Looking first to column 2002 for a packet type. When found in column 2002 then move horizontally across in the 2004 direction and at each column may be found at the intersection whether this packet type may pass or not pass the packet type in each column. For example from the table it may be seen that if there is backpressure, packets from RFDID, MR, MWR, DB, and M may pass each other. Likewise it is clear that if there is backpressure on any of the P or NP or CPL, then RFDID, MR, MWR, DB, and M may pass P or NP or CPL. Also if there is backpressure on any of the RFDID, MR, MWR, DB, and M, then P or NP or CPL can pass any of the RFDID, MR, MWR, DB, and M as long as priorities between P, NP, and CPL are followed. Also, P packets shall not pass another P but may pass NP and CPL, NP packets shall not pass P or CPL or another NP, and CPL packets shall not pass P or another CPL but may pass NP. The packet types shown in FIG. 20 are RFDID, Messaging Response (MR), Maintenance Write Response (MWR), Doorbell Maintenance (DB), Messaging (M), Posted (P), Completion (CPL), and Non-Posted (NP). RFDID is: R: Reserved Ftype 0, 1, 3, 4, 12, 14; F: Flow control (Ftype 7); D: Data Streaming Ftype 9; ID: Implementation Defined (Ftype 15).

In one embodiment of the invention the Bridge Ordering Rule and Scheduling for VOQ selection is performed by TLM based on RapidIO packet type (not priority). Using this approach separates packets for implementation of PCIe ordering rules.

In one embodiment of the invention the Bridge Ordering Rule and Scheduling uses PBMi backpressure applied based on RapidIO priority (not packet type). Using this approach allows support for RapidIO ordering rules and RapidIO deadlock prevention.

In one embodiment of the invention the Bridge Ordering Rule and Scheduling allows for PCIe rules to be respected while packets are dequeued for the User Core. Using this embodiment a CRQ maintains packet ordering and time arrival order. Using this embodiment a CRQ controls packet dequeue. Using this embodiment backpressure per queue is used to prevent deadlock and to sustain throughput.

FIG. 21 illustrates, generally at 2100, one embodiment of the invention showing Packet Ordering and Priorities for VOQ Allocation. As illustrated VOQ allocation is performed for different Packet Types for Bridging. In column 2102 is Packet Type. In column 2104 is PBM Ingress VOQ, in column 2106 is request[7:0], and at column 2108 is sri_buf_full[7:0]. Note that in FIG. 20 RFDID is: R: Reserved Ftype 0, 1, 3, 4, 12, 14; F: Flow control (Ftype 7); D: Data Streaming Ftype 9; ID: Implementation Defined (Ftype 15).

FIG. 22A illustrates, generally at 2200, part of an FType 2202 and TType 2204 operation summary. As shown are FType and TType Mapping to VOQ Selection.

FIG. 22B illustrates, generally at 2200, part of an FType 2202 and TType 2204 operation summary. As shown are FType and TType Mapping to VOQ Selection.

In one embodiment of the invention once the FType and TType Mapping to VOQ Selection is completed the TLMi notified the PBMi of its decision for proper queuing of the packet and its request. The enqueue command provides the PBM with the port-group and the VOQ within that group to which the packet is to be enqueued.

Figure 23:
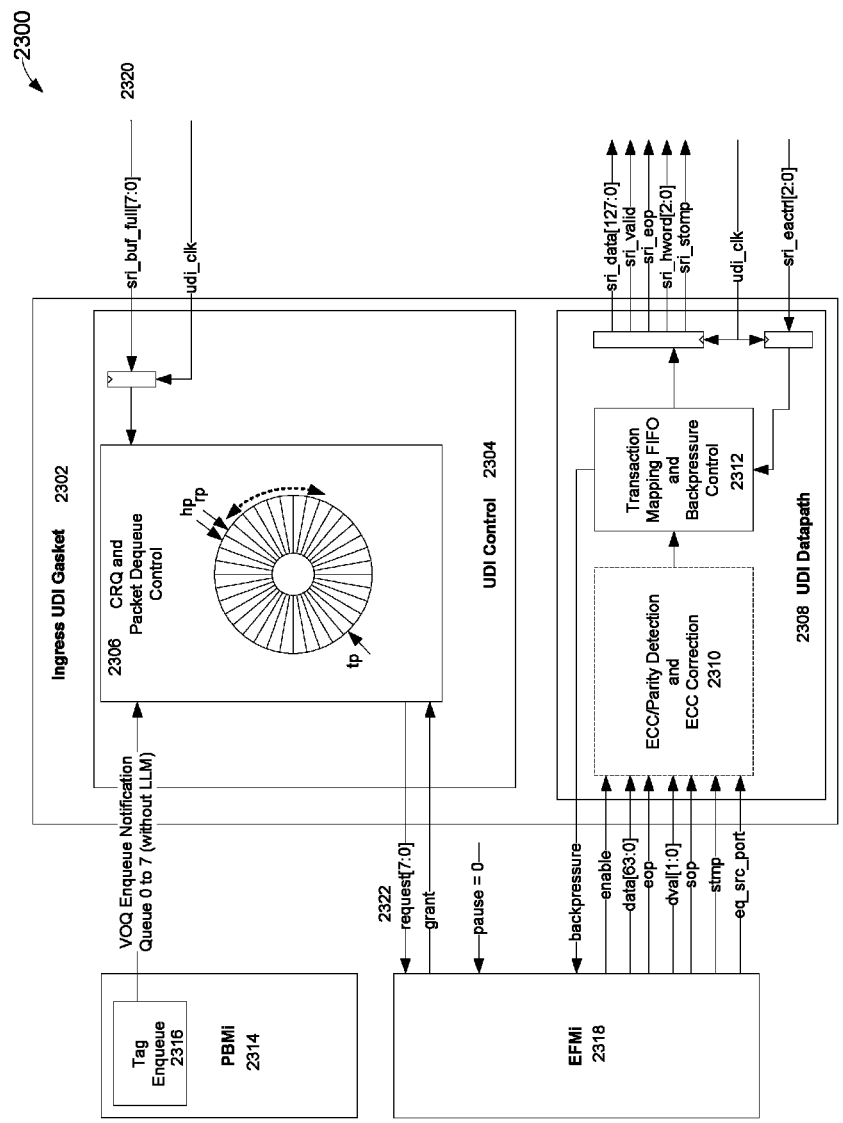
FIG. 23 illustrates one embodiment of the invention showing Bridge Ordering Rule and Scheduling.

FIG. 23 illustrates, generally at 2300, one embodiment of the invention showing Bridge Ordering Rule and Scheduling. At 2302 is an Ingress UDI Gasket which includes 2304 UDI Control and 2308 UDI Datapath. 2304 UDI Control includes 2306 CRQ and Packet Dequeue Control. 2308 UDI Datapath includes 2310 ECC/Parity Detection and ECC Correction and 2312 Transaction Mapping FIFO and Backpressure Control. At 2314 is PBMi which includes 2316 Tag Enqueue. At 2318 is EFMi. At 2320 is sri_buf_full[7:0] such as illustrated previously at 2108 in FIG. 21. 2320 sri_buf_full[7:0] allows for selective backpressure based on the packet type. At 2322 is request[7:0] such as illustrated previously at 2106 in FIG. 21. 2322 request[7:0] is a request to dequeue a packet type. In 2306 CRQ and Packet Dequeue Control hp denotes head pointer, rp denotes request pointer, and tp denotes tail pointer.

As one of skill in the art will appreciate from the description above and the figures the present invention allows for Bridge Priority and Deadlock Prevention.

In one embodiment of the invention, Bridge Priority and Deadlock Prevention, is through use of the CRQ with per Queue backpressure. This approach keeps track of packet arrival order in a stream of packets, and performs packet reorder when various flows are backpressured, and ensures deadlock prevention for the non-backpressured flows.

In one embodiment of the invention, Bridge Priority and Deadlock Prevention, is through use of the CRQ scheduler making Dequeue decisions. These decisions are based on arrival order, and are based on per queue backpressure, and are based on Bridge specific ordering rules.

In one embodiment of the invention, Bridge Priority and Deadlock Prevention, is through use of Packet Queue and Packet Dequeue. Using this approach, external to the CRQ, packets are stored in multiple VOQ structures. Additionally, each VOQ stores packets of one or more specific packet types. And within each VOQ the packets are dequeued in timestamp arrival order, and with a VOQ backpressured, the oldest packet from the 'other' VOQs is chosen. Finally rules about which packet types may pass others in the CRQ enforces PCIe ordering rules.

FIG. 24A and FIG. 24B illustrate, generally at 2400, embodiments of the invention.

At 2401 is 1. An apparatus comprising:
a serializer/deserializer (SERDES) interface;
an ingress physical layer module (PLMi) operatively coupled to said SERDES;
an ingress transport layer module (TLMi) having a port mapping block, a routing block, a port width conversion (PWC) block, and transport processing block, said TLMi operatively coupled to said PLMi;
an ingress packet buffer module (PBMi) having an enqueue block, a plurality of virtual output queues (VOQs), a plurality of data memories, and a dequeue block, said PBMi operatively coupled to said TLMi.

At 2402 is 2. The apparatus of claim 1 further comprising:
an endpoint fabric module (EFM) having a scheduler, a switch, an arbiter, and a port select, said EFM operatively coupled to said PBMi.

At 2403 is 3. The apparatus of claim 2 further comprising:
an ingress user core gasket, said ingress user core gasket operatively coupled to said EFM;
an egress user core gasket, said egress user core gasket operatively coupled to said EFM;
a user core, said user core operatively coupled to said ingress user core gasket; and
said user core operatively coupled to said egress user core gasket.

At 2404 is 4. The apparatus of claim 3 further comprising:
an ingress logical layer module (LLMi), said LLMi operatively coupled to said EFM, and said LLMi operatively coupled to said ingress user core gasket, and said LLMi operatively coupled to said egress user core gasket; and
an egress logical layer module (LLMe), said LLMe operatively coupled to said EFM, and said LLMe operatively coupled to said ingress user core gasket, and said LLMe operatively coupled to said egress user core gasket.

At 2405 is 5. The apparatus of claim 4 further comprising:
an egress packet buffer module (PBMe), said PBMe having an enqueue block, a plurality of data memories, a plurality of circular-reorder queues (CRQ), and a dequeue block, said PBMe operative coupled to said EFM.

At 2406 is 6. The apparatus of claim 5 further comprising:
an egress transport layer module (TLMe) having a transport processing block, and a port width conversion (PWC) block, said TLMe operatively coupled to said PBMe.

At 2407 is 7. The apparatus of claim 6 further comprising:
an egress physical layer module (PLMe), said PLMe operatively coupled to said TLMe;
said PLMe operatively coupled to said SERDES interface; and
said PLMe operatively coupled to said PLMi.

At 2408 is 8. The apparatus of claim 7 wherein said PBMi said plurality of VOQs and said PBMi said plurality of data memories are user configurable based on a number of ports in use from said SERDES interface.

At 2409 is 9. The apparatus of claim 8 wherein said PBMe said plurality of CRQs and said PBMe said plurality of data memories are user configurable based on a number of ports in use from said SERDES interface.

At 2410 is 10. A method comprising:
replicating a user defined number of blocks, said blocks having a SERDES interface, a SRIO core, RAM instances, an interface to a logical layer module, and an interface to an internal fabric switch;
connecting all of said blocks to said internal fabric switch; and
connecting all of said blocks to said logical layer module.

At 2411 is 11. The method of claim 10 wherein said logical layer module handles any number of said blocks.

At 2412 is 12. The method of claim 11 wherein said logical layer module is a single logical layer module.

At 2413 is 13. An apparatus comprising:
a tag enqueue block having an input and an output, said tag enqueue block input coupled to receive packet flowID on a per channel basis from a fabric;
an egress tag CRQ having an input, an output, a back pressure output, and a data memory, said egress tag CRQ input coupled to receive said tag enqueue block output, said egress tag CRQ back pressure output coupled to said fabric, said data memory coupled to said fabric;
a packet dequeue block having a first input and a second input, said packet dequeue block first input coupled to said egress tag CRQ output; and
an egress transport layer module (TLMe) having a pacing and acknowledgement output, a data input, and a data pacing output, said packet dequeue block second input coupled to receive said TLMe pacing and acknowledgement output, said TLMe data input coupled to said data memory, and said TLMe data pacing output coupled to said memory.

At 2414 is 14. An apparatus comprising:
a tag enqueue block having an input, an output, and a VOQ enqueue notification per channel output, said tag enqueue block input coupled to receive a port mask, a CRF, and a PRIO on a per channel basis from a transport layer;
an ingress tag memory block having, an ingress tag memory, a tail VOQ table, and a head VOQ table, said tail VOQ table coupled to said tag enqueue block output;
a packet dequeue block having a first input and a second input, said packet dequeue block first input coupled to said head VOQ table;
a scheduler having an input, a grant interface per channel output, and a VOQ interface per channel output, said tag enqueue block VOQ enqueue notification per channel output coupled to said scheduler input, said scheduler grant interface per channel output coupled to said packet dequeue block second input, and said scheduler VOQ interface per channel output coupled to said head VOQ table.

At 2415 is 15. The apparatus of claim 14 wherein said ingress tag memory block further comprises a memory having a first input, a second input, and an output, said memory first input coupled to said transport layer, and said memory output coupled to a switch fabric, and said second input coupled to said switch fabric.

Thus a method and apparatus for a configurable packet routing, buffering and scheduling scheme to optimize throughput with deadlock prevention in SRIO-to-PCIe Bridges have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
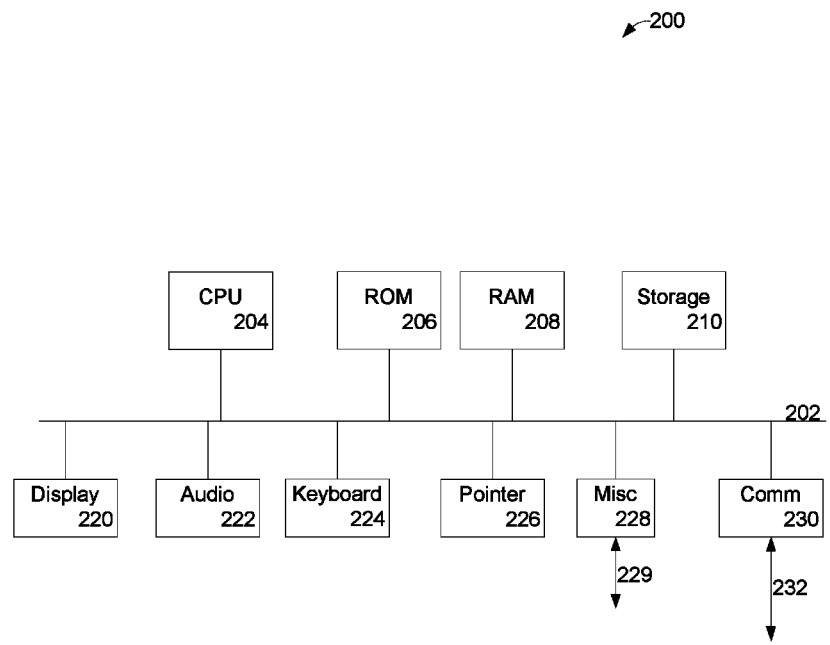
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk- read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: TType is also spelled Ttype, TTYPE, ttype, etc.

Throughout the description various terms have been used that should be familiar to one of skill in the art, for example VOQ—Virtual Output Queue—a storage mechanism where packets are segregated but kept in timestamp order within the segregation should be known to one of skill in the art. Additionally terms where needed have been defined, for example, FlowID is the combination of RapidIO packet's PRIOrity and Critical-Request-Flow fields; CRQ—Circular Reordering Queue, etc. RFDID has been explained and one of skill in the art is familiar with TTYPE[0:3] and FTYPE[0:3] type TRANSACTION[0:3] as defined by RapidIO (e.g. Format type is a RapidIO packet field. It is represented as a 4-bit value, and is the first four bits in the logical packet stream. A RapidIO packet field, the specific transaction within the format type to be performed by the recipient. It is also called TYPE, TTYPE, or TType; e.g. transaction is understood by one of skill in the art as the specific transaction within the format class to be performed by the recipient; also called type or ttype; etc.).

Reference has been made to RapidIO and Serial RapidIO. One of skill in the art is familiar with the two incarnations of the RapidIO technology and is aware of the many common features and that the main difference between the parallel and serial RapidIO is the interface and the clock.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes physical movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

As used in this description, "acknowledgment" and "acknowledgement" are variant spellings of the same word and are to be considered the same even if both variants are used in a sentence, claim, etc.

It is to be understood that in any one or more embodiments of the invention where alternative approaches or techniques are discussed that any and all such combinations as might be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for a configurable packet routing, buffering and scheduling scheme to optimize throughput with deadlock prevention in SRIO-to-PCIe Bridges have been described.

What is claimed is:

1. An apparatus comprising:
a serializer/deserializer (SERDES) interface having an input coupled to receive packets;
an ingress physical layer module (PLMi) directly coupled to said SERDES for receiving said packets;
an ingress transport layer module (TLMi) having a port mapping block, a routing block, a port width conversion (PWC) block, and transport processing block, said TLMi directly coupled to said PLMi;
an ingress packet buffer module (PBMi) having an enqueue block, a plurality of virtual output queues (VOQs), a plurality of data memories, and a dequeue block, said PBMi directly coupled to said TLMi; and
said dequeue block directly coupled to a circular-reorder queue (CRQ) said CRQ implemented in hardware and having a last free pointer to an open location in said CRQ, a next to send pointer in said CRQ a first free location pointer in said CRQ, a last packet enqueued pointer in said CRQ, and wherein said CRQ has an acknowledgement identification for each of said received packets.

2. The apparatus of claim 1 further comprising:
an endpoint fabric module (EFM) having a scheduler, a switch, an arbiter, and a port select, said EFM operatively coupled to said PBMi.

3. The apparatus of claim 2 further comprising:
an ingress user core gasket, said ingress user core gasket operatively coupled to said EFM;
an egress user core gasket, said egress user core gasket operatively coupled to said EFM;
a user core, said user core operatively coupled to said ingress user core gasket; and
said user core operatively coupled to said egress user core gasket.

4. The apparatus of claim 3 further comprising:
an ingress logical layer module (LLMi), said LLMi operatively coupled to said EFM, and said LLMi operatively coupled to said ingress user core gasket, and said LLMi operatively coupled to said egress user core gasket; and
an egress logical layer module (LLMe), said LLMe operatively coupled to said EFM, and said LLMe operatively coupled to said ingress user core gasket, and said LLMe operatively coupled to said egress user core gasket.

5. The apparatus of claim 4 further comprising:
an egress packet buffer module (PBMe), said PBMe having an enqueue block, a plurality of data memories, a plurality of said circular-reorder queues (CRQ), and a dequeue block, said PBMe directly coupled to said EFM.

6. The apparatus of claim 5 further comprising:
an egress transport layer module (TLMe) having a transport processing block, and a port width conversion (PWC) block, said TLMe operatively coupled to said PBMe.

7. The apparatus of claim 6 further comprising:
an egress physical layer module (PLMe), said PLMe operatively coupled to said TLMe;
said PLMe operatively coupled to said SERDES interface; and
said PLMe operatively coupled to said PLMi.

8. The apparatus of claim 7 wherein said PBMi said plurality of VOQs and said PBMi said plurality of data memories are user configurable based on a number of ports in use from said SERDES interface.

9. The apparatus of claim 8 wherein said PBMe said plurality of CRQs and said PBMe said plurality of data memories are user configurable based on a number of ports in use from said SERDES interface.

* * * * *